United States Patent [19]

Wai et al.

[11] Patent Number: 5,770,085
[45] Date of Patent: Jun. 23, 1998

[54] EXTRACTION OF METALS AND/OR METALLOIDS FROM ACIDIC MEDIA USING SUPERCRITICAL FLUIDS AND SALTS

[75] Inventors: Chien M. Wai; Neil G. Smart; Yuehe Lin, all of Moscow, Id.

[73] Assignee: Idaho Research Foundation, Inc., Moscow, Id.

[21] Appl. No.: 458,759

[22] Filed: Jun. 2, 1995

Related U.S. Application Data

[63] Continuation-in-part of Ser. No. 253,000, Jun. 2, 1994, Pat. No. 5,730,874, which is a continuation-in-part of Ser. No. 781,086, Oct. 21, 1991, Pat. No. 5,356,538, which is a continuation-in-part of Ser. No. 714,265, Jun. 12, 1991, Pat. No. 5,274,129.

[51] Int. Cl.⁶ ............................. B01D 11/04; B01D 11/00
[52] U.S. Cl. ........................ 210/638; 210/639; 210/912; 423/21.5
[58] Field of Search ................................... 210/634, 638, 210/511, 639, 912; 423/22, 24, 21.1, 21.5; 252/364; 134/1

[56] References Cited

U.S. PATENT DOCUMENTS

| | | |
|---|---|---|
| 4,015,980 | 4/1977 | MacKay et al. . |
| 4,051,223 | 9/1977 | MacKay . |
| 4,069,273 | 1/1978 | Komoto . |
| 4,206,132 | 6/1980 | Sievers . |
| 4,275,039 | 6/1981 | Özensoy et al. . |
| 4,457,812 | 7/1984 | Rado . |
| 4,464,251 | 8/1984 | Kukes et al. ............................. 208/221 |
| 4,465,587 | 8/1984 | Garg et al. ................................. 208/87 |
| 4,528,100 | 7/1985 | Zarchy . |
| 4,529,503 | 7/1985 | Kukes .................. 208/251 R |
| 4,547,292 | 10/1985 | Zarchy . |
| 4,563,213 | 1/1986 | Hubred . |
| 4,895,905 | 1/1990 | Schneider et al. . |
| 4,898,673 | 2/1990 | Rice et al. . |
| 4,908,135 | 3/1990 | Brisdon et al. . |
| 4,911,941 | 3/1990 | Katz et al. . |
| 4,916,108 | 4/1990 | McLaughlin et al. . |
| 4,942,149 | 7/1990 | Shinbo et al. . |

(List continued on next page.)

FOREIGN PATENT DOCUMENTS

| | | |
|---|---|---|
| 61225139 | 1/1993 | Japan . |
| 59020406 | 3/1994 | Japan . |
| WO92/10263 | 11/1991 | WIPO . |
| PCT/US94/06450 | 10/1992 | WIPO . |

OTHER PUBLICATIONS

"Enhanced Extraction of Lanthanides with Crown Ether Carboxylic Acids of Increasing Lipophilicity," by Tang, et al., *Analyst*, 114:451–453 (1989).

"Solvent Extraction of Dithiocarbamated Complexes and Back–Extraction with Mercury(II) for Determination of Trace Metals in Seawater by Atomic Absorption Spectrometry," by Lo, et al., *Anal. Chem.*, 54:2536–2539 (1982).

"Supercritical Fluids Offer Improved Separations," Ward Worthy, *Chemical & Engineering News*, 59:16 (1981).

*Primary Examiner*—Joseph W. Drodge
*Attorney, Agent, or Firm*—Klarquist Sparkman Campbell Leigh & Whinston, LLP

[57] ABSTRACT

A method of extracting metalloid and metal species from a solid or liquid material by exposing the material to a fluid solvent, particularly supercritical carbon dioxide, containing a chelating agent is described. The chelating agent forms chelates that are soluble in the fluid to allow removal of the species from the material. In preferred embodiments, the extraction solvent is supercritical carbon dioxide and the chelating agent comprises a trialkyl phosphate, a triaryl phosphate, a trialkylphosphine oxide, a triarylphosphine oxide, or mixtures thereof. The method provides an environmentally benign process for removing contaminants from industrial waste. The method is particularly useful for extracting actinides from acidic solutions, and the process can be aided by the addition of nitrate salts. The chelate and supercritical fluid can be regenerated, and the contaminant species recovered, to provide an economic, efficient process.

31 Claims, 5 Drawing Sheets

U.S. PATENT DOCUMENTS

| | | | |
|---|---|---|---|
| 4,964,995 | 10/1990 | Chum et al. | 210/634 |
| 5,006,254 | 4/1991 | Cailly et al. | 210/639 |
| 5,087,370 | 2/1992 | Schultheis et al. . | |
| 5,169,968 | 12/1992 | Rice . | |
| 5,274,129 | 12/1993 | Natale et al. . | |
| 5,332,531 | 7/1994 | Horwitz et al. | 588/20 |
| 5,356,538 | 10/1994 | Wai et al. . | |
| 5,606,724 | 2/1997 | Wai et al. | 423/21.1 |
| 5,641,887 | 6/1997 | Beckman et al. | 210/634 |

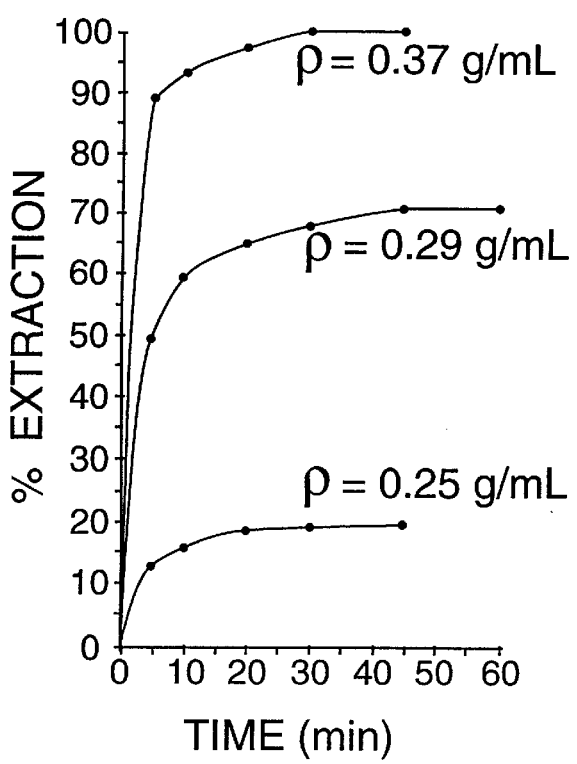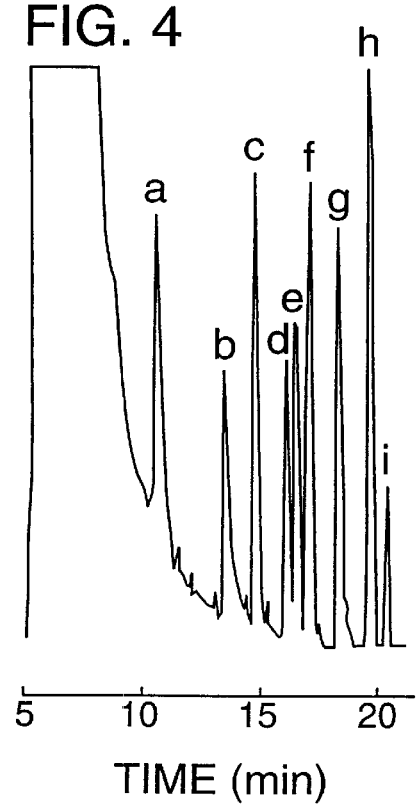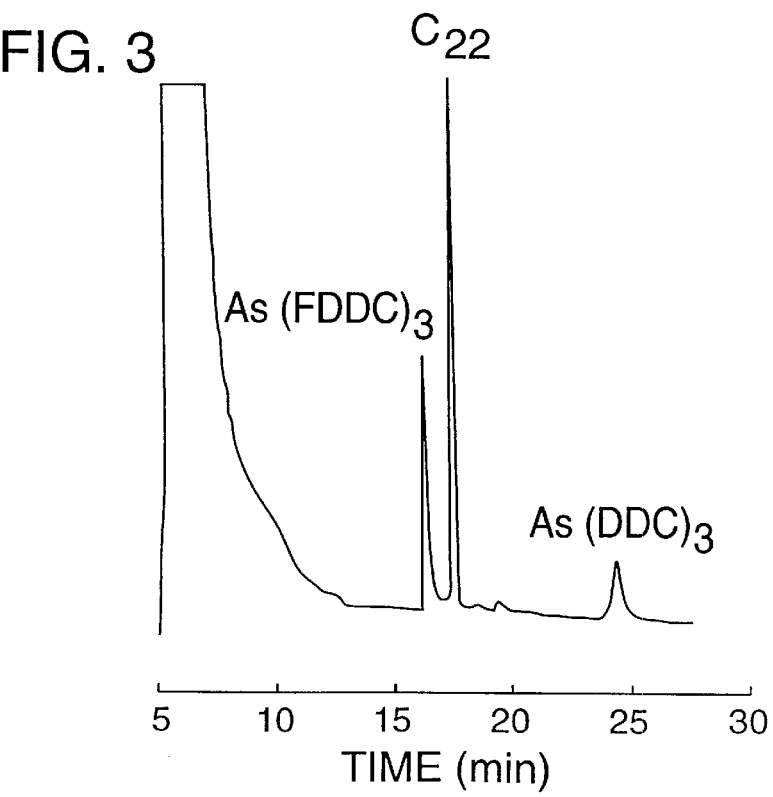

EXTRACTION OF METALS AND/OR METALLOIDS FROM ACIDIC MEDIA USING SUPERCRITICAL FLUIDS AND SALTS

CROSS REFERENCE TO RELATED APPLICATION

This application is a continuation-in-part of U.S. patent application, Ser. No. 08/253,000, filed Jun. 2, 1994, now U.S. Pat. 5,730,874, which is a continuation-in-part of U.S. patent application, Ser. No. 07/781,086, filed Oct. 21, 1991, now U.S. Pat. 5,356,538, which is a continuation-in-part of U.S. patent application, Ser. No. 07/714,265, filed Jun. 12, 1991 now U.S. Pat. No. 5,274,129, . The disclosures of each of these prior applications is incorporated herein by reference.

ACKNOWLEDGEMENT OF GOVERNMENT SUPPORT

This invention was funded in part by (1) the United States Department of Energy, under Special Master Task research, Subcontract No. C85-110554, (2) a grant from DOE Idaho Field Office under the Office of Technology Development's Innovative Technology Department Program and by NSF-Idaho EPSCOR Program under NSF Cooperative Agreement OSR-9350539, and (3) the National Science Foundation, under Grant RII-8902065. The United States Government may have certain rights in this invention as a result of these grants.

FIELD OF THE INVENTION

This invention concerns extraction of metalloids and metals from solids and liquids, and is more particularly directed to a treatment process in which metals are efficiently extracted from waste material.

BACKGROUND OF THE INVENTION

Waste treatment and disposal is an important social and economic issue. Industries throughout the world spend large sums of money to reduce the biological hazards of environmental exposure to toxic substances. One particular environmental problem is the removal of toxic metals and radioisotopes from solid or liquid industrial wastes. Such contaminants can be removed from soils, for example, by treating the soil with an acid that dissolves the metals. Acid dissolution is followed by selective precipitation, electrowinning, or solvent extraction. Acid dissolution is unfortunately very nonspecific, and often produces many by-products that can create serious environmental problems in their own right.

An alternative detoxification process is to encapsulate contaminants in a container or insoluble matrix that prevents their entry into the environment. This approach still requires storage of the bulky matrix, and does not allow regeneration or reuse of the contaminants. Hence there is a need for a biologically compatible waste treatment process that efficiently and effectively separates metals from contaminated materials. There is also a need for such a process that is biologically compatible and permits selective regeneration and reuse of the contaminants.

One of the present inventors previously has disclosed that enhanced extraction of metals can be achieved with ionizable crown ethers, such as crown ether carboxylic acids. The inventors have found that these macrocyclic ethers have cavities that can selectively extract lanthanides and actinides by attracting these species with an ionized side chain. The metal ion is then inserted into the cavity of the macrocycle to form a chelate. Analyst, 114:451–453 (1989) and Anal. Chem 58:3233–3235 (1986). This mechanism of attracting the ion and inserting it in the ring has earned these compounds the name of "lariat crown ethers." In these reports, a crown ether carboxylic acid (sym-dibenzo-16-crown-5-oxyacetic acid) was used to extract lanthanides from aqueous solutions into an organic phase with high efficiency and selectivity. U.S. Pat. No. 4,908,135 similarly discloses separation of secondary and tertiary amines using a different crown ether, while U.S. Pat. No. 4,942,149 shows separation of racemic compounds with yet other crown ethers.

An unrelated solvent extraction method is fluid extraction, such as supercritical fluid extraction. A supercritical fluid is typically one that is gaseous at ambient conditions, but which is maintained at a temperature and pressure above its critical temperature and pressure. Although materials may perform as solvents at sub-critical temperatures and pressures, fluids often perform better as solvents at super-critical conditions. Supercritical solvents can be used to extract organic materials such as caffeine from coffee beans. U.S. Pat. No. 4,911,941 provides an example of supercritical carbon-dioxide extraction of caffeine in which green coffee beans are moved periodically through an extraction vessel and contacted with continuously flowing supercritical carbon dioxide. U.S. Pat. No. 4,898,673 shows a similar system in which soluble materials are continuously extracted from solids using supercritical carbon dioxide. The soluble solids are circulated in a closed-loop pipeline with the supercritical fluid.

Supercritical extraction of environmental wastes has not previously been suggested. This may be due to the relatively low solubility of metals and other nonorganic materials in supercritical fluids. Direct extraction of metal ions by supercritical carbon dioxide, for example, is inefficient because of the weak van der Waals interaction between metal ions and carbon dioxide. This weak interaction has apparently discouraged efforts to perform supercritical fluid extraction of metals from environmental wastes.

SUMMARY OF THE INVENTION

The present invention provides a method for extracting metal species, such as lanthanides and actinides, from a solid or liquid by exposing the solid or liquid to a fluid solvent, particularly a supercritical fluid solvent, that contains a chelating agent. The fluid or supercritical fluid solvent and chelating agent are exposed to the solid or liquid for a sufficient period of time to form a chelate between the metal and chelating agent that is soluble in the fluid. The fluid or supercritical fluid then is removed from the solid or liquid with the solubilized metal chelate dissolved in the fluid. The metal chelates subsequently can be precipitated from the fluid. For example, if the fluid is supercritical, then the metal chelates can be precipitated by reducing the pressure of the supercritical fluid. The chelating agent can also be regenerated for reuse. The resulting process is an efficient, cost-effective method for removing metals from the environment without using environmentally harmful extraction solvents.

The chelating agents can be any agent that forms a chelate with the metal being extracted, wherein the chelate is soluble in the fluid or supercritical fluid solvent. Examples of suitable chelating agents include dithiocarbamates, ionizable crown ethers, $\beta$-diketones organic phosphates, organic phosphine oxides, and mixtures thereof. Specific examples of suitable chelating agents are provided below in the detailed description. These examples are provided solely for illustrative purposes, and should not be construed to limit the invention to the specific chelating agents discussed herein.

The solubilities of some halogenated metal chelates in supercritical carbon dioxide, and in particular the fluorinated metal chelates, are enhanced by two to three orders of magnitude relative to the corresponding halogenated metal chelates. For instance, the solubility of $Cu(FDDC)_2$ in supercritical carbon dioxide is about $1\times10^{-3}$ moles per liter at 50° C. and 100 atmospheres, whereas the solubility of the nonfluorinated compound, $Cu(DDC)_2$, is less than $1\times10^{-6}$ moles per liter under the same conditions. Fluorinated chelating agents have been found to greatly enhance the efficiency of metal extraction in supercritical carbon dioxide. As a result, fluorinated chelating agents currently are preferred chelating agents useful for practicing the present invention.

In yet other embodiments of the invention, a modifier is added to the supercritical fluid to further enhance the efficiency of the extraction method by increasing the solubility of the metal chelate in the supercritical fluid. Carbon dioxide, for example, is a relatively non-polar solvent. Its polarity can be increased by adding a more polar solvent to the supercritical carbon dioxide. Examples of polar solvents useful for practicing the invention include water and low to medium boiling point alcohols or esters, such as methanol. The alcohol or ester increases the polarity of the supercritical fluid, enhances the solubility of the metal chelate in the fluid, and further improves the extraction efficiency of the method.

A preferred method according to the present invention comprises exposing a solid or liquid containing metal or metalloid ions to carbon dioxide, particularly supercritical carbon dioxide, containing a ligand selected from the group consisting of fluorinated β-diketones, trialkyl phosphates, triaryl phosphates, alkyl-aryl phosphates, trialkylphosphine oxides, triarylphosphine oxides, alkyl-arylphosphine oxides, and mixtures thereof. Especially preferred embodiments comprise extracting metal or metalloid ions from acidic media using supercritical carbon dioxide and a material selected from the group consisting of organic phosphine oxides and organic phosphates, particularly with the addition of a nitrate salt. With reference to specific embodiments, the concentration of the acidic solution can range from 1M to 10M when the chelating agent is tributyl phosphate, and 0.1M to 10M when the chelating agent is triphenylphosphine oxide, tributylphosphine oxide, trioctylphosphine oxide, or materials having both alkyl and aryl ligands. As used herein, the term "aryl" refers generally to aromatic compounds, including but not limited to, benzene and the alkyl benzenes, such as toluene, as well as other aromatic compounds such as naphthalene. At least one of the fluorinated β-diketones, organic phosphates, or organic phosphine oxides, forms chelates with the metal or metalloid species. The chelated metals or metalloids are soluble in the supercritical carbon dioxide.

The fluorinated β-diketone may be represented by the formula

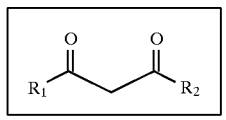

wherein $R_1$ and $R_2$ are independently selected from the group consisting of fluorinated lower alkyl, aryls, fluorinated thenoyl groups, and mixtures thereof. The organic phosphate chelating agent may be represented by the formula

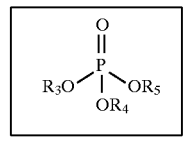

wherein $R_3$, $R_4$ and $R_5$ are independently selected from the group consisting of lower alkyl groups, aryl groups, and mixtures thereof. The organic phosphine oxide may be represented by the formula

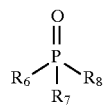

wherein $R_6$–$R_8$ are independently selected from the group consisting of lower alkyl groups, aryl groups, and mixtures thereof.

The present invention also provides an extraction solvent, comprising a supercritical fluid and a chelating agent selected from the group consisting of β-diketones, organic phosphates, organic phosphine oxides, and mixtures thereof. The solvent preferably is supercritical carbon dioxide.

In more particular embodiments of the invention, a system is provided for treating waste material containing metal species. The material is placed in a container through which the fluid or supercritical fluid is passed to solubilize the metal species. The fluid or supercritical fluid and solubilized metal species are removed from the container to separate the metal species from the waste material. In preferred embodiments, a chelating agent is dissolved in the fluid to form chelates with the metal species that are soluble in the fluid. In especially preferred embodiments, the chelates are fluorinated to further increase their solubility and enhance the extraction efficiency of the separation method. Polar solvents such as alcohols or esters can be added to the supercritical fluid to also enhance solubility of the metal chelate in the supercritical fluid.

Fluid or supercritical fluid can be flowed continuously through the waste material, or exposed to the material in a discontinuous batch process. In one embodiment, a supercritical fluid is flowed through a chelating agent before the waste material is exposed to the fluid to dissolve the chelating agent in the fluid. After the metal chelates have formed and dissolved in the supercritical fluid, the pressure on the supercritical fluid can be reduced to below supercritical levels such that the fluid becomes a gas and the metal chelates are precipitated from the system. The pure metal can then be collected, and the chelating agent recycled to further extract the waste material. The chelating agent can be separated from the metal, for example, by 0.1M or more concentrated nitric acid with a pH less than or equal to 1.

Accordingly, it is an object of this invention to provide an improved method for extracting metals from liquids or solids, including complex matrices.

Another object of the invention to provide such an improved method that allows efficient and biologically compatible extraction of metals from the environment.

Another object is to provide such an improved method that allows selectivity as to the type of metal extracted by the system.

Another object is to provide such an improved method that can selectively extract lanthanides and actinides.

Another object of this invention is to provide such an improved method that is efficient and economical compared to many other extraction processes.

Another object of this invention is to provide a process for the selective removal of ions from acidic waste systems.

Another object of this invention is to provide a process for the efficient extraction of metals and metalloids from solid and liquid materials using a β-diketone, particularly a fluorinated β-diketone.

Another object of this invention is to provide a process for the fluid extraction of metal and metalloids from solid and liquid materials using a mixed ligand composition comprising a β-diketone, particularly a fluorinated β-diketone, and a trialkyl phosphate.

Still another object of this invention is to provide a method for extracting metal or metalloid species from acidic media using carbon dioxide as the solubilizing agent, and organic phosphates and/or organic phosphine oxides as the chelating agents.

These and other objects of the invention will be understood more clearly by reference to the following drawings and detailed description.

BRIEF DESCRIPTION OF THE DRAWINGS

FIG. 2 is a graph illustrating the rate of extraction of $Cu^{2+}$ from water using supercritical $CO_2$ with varying densities at 35° C. saturated with bis(trifluoroethyl)dithiocarbamate (FDDC).

FIG. 3 is a chromatogram produced using a superbond capillary column injected at 100° C. oven temperature with a hold time of 6.5 minutes at 100 atm followed by a 4.0 atm/minute ramp.

FIG. 4 is a chromatogram as in FIG. 3 showing peaks for (a) NaFDDC, (b) $Zn(FDDC)_2$, (c) $Ni(FDDC)_2$, (d) $Co(FDDC)_3$, (e) $Fe(FDDC)_3$, (f) $Hg(FDDC)_2$, (g) $As(FDDC)_3$, (h) $Sb(FDDC)_3$, (i) $Bi(FDDC)_3$.

DETAILED DESCRIPTION OF SEVERAL PREFERRED EMBODIMENTS

General Discussion of the Invention

The present invention concerns a method for extracting metalloids or metals from solid or liquid materials by exposing the material to a fluid solvent or a supercritical fluid solvent. The fluid or supercritical fluid preferably contains either a chelating agent that forms a metal chelate with the extracted metal, or the fluid may include a ligand and a solubility-enhancing agent. The chelate is soluble in the fluid, particularly supercritical fluids, which allows efficient extraction of the chelate from the material.

The present invention is suitable for removing many different types of metalloids or metals from liquids or solids. Metalloids are elements with both metallic and non-metallic properties, and include arsenic, selenium and tellurium. A metal is an element that forms positive ions in solutions, and produces oxides that form hydroxides rather than acids with water. Metals include alkali metals, alkali-earth metals, transition metals, noble metals (including the precious metals gold, platinum and silver), rare metals, rare-earth metals (lanthanides), actinides (including the transuranic metals), light metals, heavy metals, synthetic metals and radioactive metals. Specific examples are given herein of extraction methods for removing lanthanides and actinides (collectively referred to as the f-group elements from the filling of their 4f and 5f orbitals) as well as transition metals such as copper. The f group elements are commonly produced by nuclear fission reactions, and the actinides are radioactive. Transition metals are commonly used or produced in many industrial processes and products, such as mineral production or fly ash. The present invention also provides specific examples of extraction methods for radioactive metals, such as uranium, particularly the extraction of such metals from acidic solutions. This provides an attractive alternative to the PUREX process for recovering uranyl ions from acidic solutions.

Suitable fluids and/or supercritical fluids for use in the present invention include carbon dioxide, nitrogen, nitrous oxide, methane, ethylene, propane and propylene. Carbon dioxide is a particularly preferred fluid for both subcritical and supercritical fluid extractions because of its moderate chemical constants ($T_c$=31° C., $P_c$ 73 atm) and its inertness (i.e. it is non-explosive and thoroughly safe for extractions, even extractions performed at supercritical conditions). Carbon dioxide also is a preferred solvent because it is abundantly available and relatively inexpensive.

Figure 7:
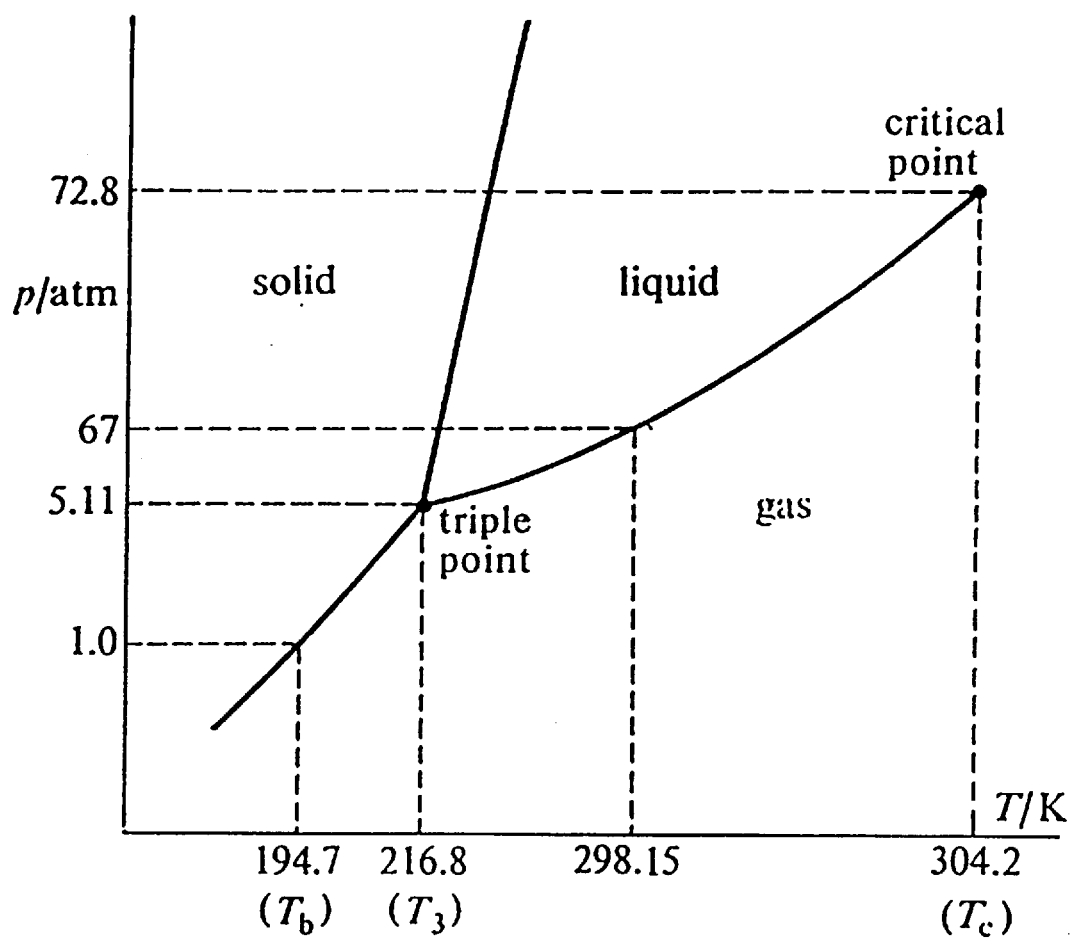
FIG. 7 is a phase diagram for carbon dioxide.

FIG. 7 is a phase diagram for carbon dioxide which shows the conditions ecessary to produce either subcritical liquid carbon dioxide or supercritical carbon dioxide. Although all conditions above the triple point ($T_p$) produce a carbon dioxide fluid solvent effective for practicing the present invention, the preferred carbon dioxide solvent is supercritical. Therefore the conditions typically must be above the critical temperature and pressure for carbon dioxide. However, virtually any conditions that are above the critical point are acceptable for producing a supercritical carbon dioxide fluid solvent useful for practicing the extraction process of the present invention.

The fluids may be used either individually or in combinations, as mixed fluids or supercritical fluid solvents. Examples of other fluids, and their critical temperature and pressure, are shown in the following Table I:

TABLE I

PHYSICAL PARAMETERS OF SELECTED SUPERCRITICAL FLUIDS*

| Fluid | Molecular Formula | $T_c$ (°C.) | $p_c$ (atm) | $\rho_c$ (g/mL) | $\rho400_{atm}$** |
|---|---|---|---|---|---|
| Carbon dioxide | $CO_2$ | 31.1 | 72.9 | 0.47 | 0.96 |
| Nitrous oxide | $N_2O$ | 36.5 | 71.7 | 0.45 | 0.94 |
| Ammonia | $NH_3$ | 132.5 | 112.5 | 0.24 | 0.40 |
| η-Pentane | $C_5H_{12}$ | 196.6 | 33.3 | 0.23 | 0.51 |
| η-Butane | $C_4H_{10}$ | 152.0 | 37.5 | 0.23 | 0.50 |
| η-Propane | $C_3H_6$ | 96.8 | 42.0 | 0.22 | — |
| Sulfur hexafluoride | $SF_6$ | 45.5 | 37.1 | 0.74 | 1.61 |
| Xenon | Xe | 16.6 | 58.4 | 1.10 | 2.30 |
| Dichlorodifluoromethane | $CCl_2F_2$ | 111.8 | 40.7 | 0.56 | 1.12 |
| Trifluoromethane | $CHF_3$ | 25.9 | 46.9 | 0.52 | — |
| Methanol | $CH_3OH$ | 240.5 | 78.9 | 0.27 | — |
| Ethanol | $C_2H_5OH$ | 243.4 | 63.0 | 0.28 | — |
| Isopropanol | $C_3H_7OH$ | 235.3 | 47.0 | 0.27 | — |
| Diethyl ether | $(C_2H_5)_2O$ | 193.6 | 36.3 | 0.27 | — |
| Water | $H_2O$ | 374.1 | 218.3 | | |

*data from Matheson Gas Data Book (1980) and CRC Handbook of Chemistry and Physics (CRC Press, Boca Raton, Florida 1984).
**$T_r$ = 1.03

In addition, a modifier may be added to the fluid, including supercritical fluids, to improve the solvent characteristics thereof. The most useful modifiers are the low to medium boiling point alcohols and esters. Typical modifiers include methanol, ethanol, ethyl acetate and the like. The modifiers typically are added to the fluids at proportions of between about 0.1% and 20.0% by weight. The modifiers contemplated for use herein are most typically not supercritical fluids at the disclosed operating conditions. Rather, the modifiers are simply dissolved in the fluid solvents, including the supercritical fluid solvents, to improve their solvent properties.

In one embodiment the chosen enhancer is combined with a supercritical fluid at the described proportions prior to feeding the supercritical fluid to the extraction vessel. Alternatively, the supercritical fluid is fed to the extraction vessel without the enhancer. The enhancer is then introduced into the extraction vessel and thereby combined with the supercritical fluid.

Some chelating agents that may be useful for solubilizing metals in supercritical fluids include:

TABLE II

COMMONLY USED METAL CHELATING AGENTS

O-Donating Chelating Reagents

Cupferron
Chloranillic acid and related reagents
β-diketones and related reagents
N-Benzoyl-N-phenylhydroxylamine and related reagents
Macrocyclic compounds
N-Donating Chelating Reagents α-dioximines
Diaminobenzidine and related reagents
Porphyrines and related reagents
O, N-Donating Chelating Reagents 8-Hydroxyquinoline
Nitrosonapthols and nitrosophenols
EDTA and other complexionates
Diphenylcarbazide and diphenylcarbazone
Azoazoxy BN
S-Donating Chelating Reagents Sodium diethlydithiocarbamate and related reagents
Dithizone and related reagents
Bismuthiol II
Thiothenoyltrifluoacetone
Thioxine
P-Donating Chelating Reagents
Tributylphoshpate and related reagents A. Specific Examples of Copper Extraction The following examples illustrate several specific embodiments for practicing the method of the present invention. These examples are provided solely to illustrate the invention and should not be construed to limit the invention to those particular features shown.

EXAMPLE I

Figure 1:
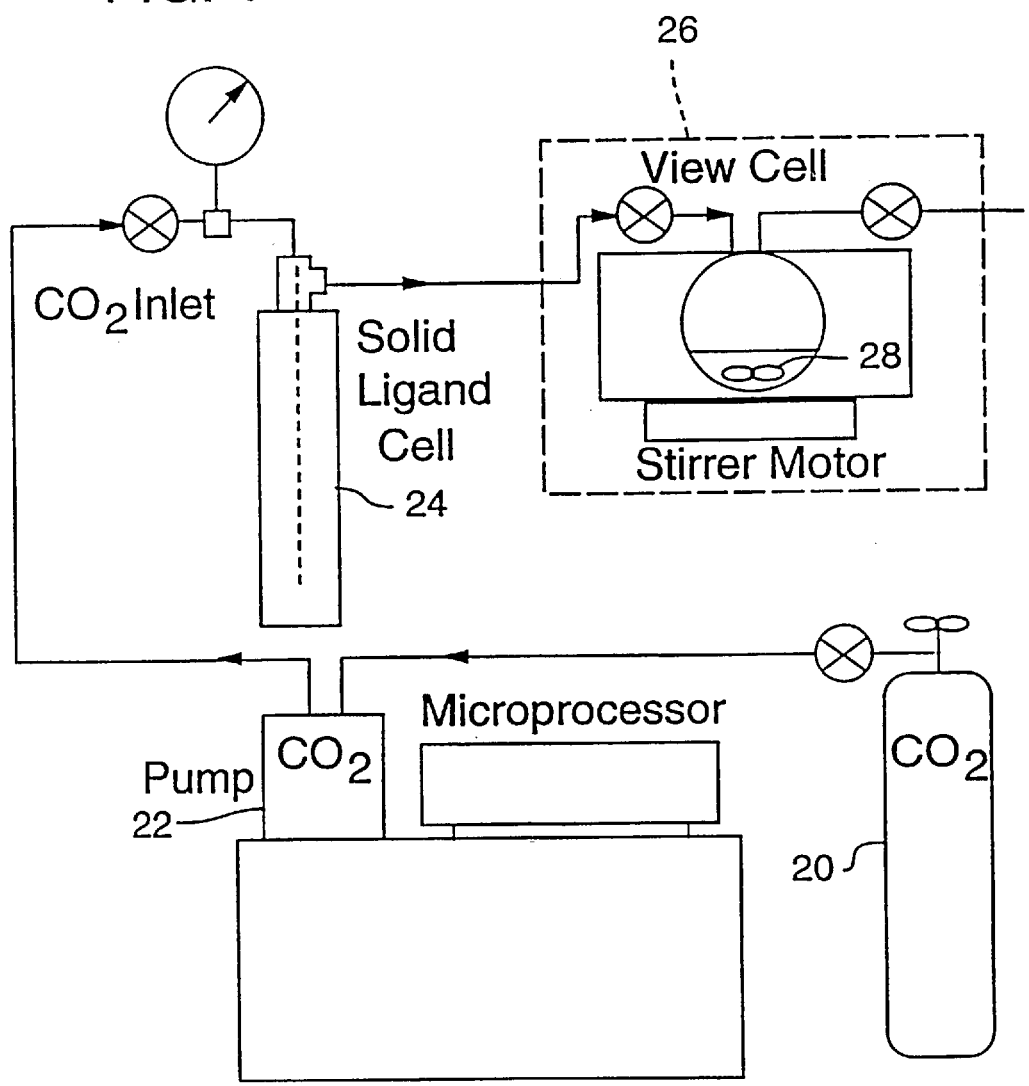
FIG. 1 is a schematic view of a system for using supercritical fluid to extract $Cu^{2+}$ from an aqueous solution.

This example illustrates a process for bulk and continuous SFE extraction, with reference to the extraction device shown in FIG. 1. The sample bulk extraction device of FIG. 1 includes a source 20 of supercritical $CO_2$ that directly extracts Cu ions from aqueous solution. The supercritical $CO_2$ was delivered from a high pressure syringe pump 22 and passed through solid lithium bis(trifluoroethyl) dithiocarbamate (FDDC) which was contained in a stainless steel, high pressure extraction vessel 24. The supercritical $CO_2$ containing dissolved FDDC was subsequently introduced to a second extraction vessel 26 fitted with quartz windows and containing an aqueous solution 28 of $Cu(NO_3)_2$ below a SCF $CO_2$ phase. Extraction of Cu was monitored by UV-Visible spectroscopy as the formation of the $CO_2$ soluble complex $Cu(FDDC)_2$, the structure of which is shown below.

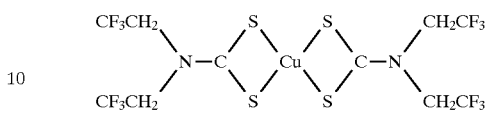

For the bulk extraction system of FIG. 1 where mixing of the aqueous and supercritical fluid phases were carried out by simple stirring, extraction efficiency was found to be pressure dependent. As seen from FIG. 2, the initial extraction rate is very rapid. Within about 5 minutes, approximately 70% of the complex saturation value at the given fluid density was achieved. Finally, quantitative extraction of the copper ions had been achieved in about 30 minutes with a pressure of 79.3 bar and a temperature of 35° C. At 50° C., quantitative extraction occurred at a $CO_2$ density of 0.29 g/cm$^3$ in less than 5 minutes, thus indicating an appropriate rate increase from 35° C.

A continuous extraction process was set up using the apparatus of FIG. 1 in which a high pressure recirculating pump was installed in line with the extraction system. Quantitative extraction occurred even more rapidly than in the bulk system with quantitative extraction occurring in less than 5 minutes at 35° C.

The above results demonstrate that quantitative extraction of metal ions from an aqueous or liquid matrix is possible with both bulk and continuous reactor systems using a dissolved molecular complexionate in the supercritical fluid phase.

EXAMPLE II

This example illustrates a process for extracting metals and/or metalloids from a solid matrix. The same apparatus used in Example I was also used in the extraction of Cu ions adsorbed on a solid matrix. In this case, solid $Cu(NO_3)_2$ adsorbed on silica ($SiO_2$) was placed in the second extraction vessel. Supercritical $CO_2$ containing dissolved ligand, FDDC, was then introduced into the cell. Extraction efficiency was again monitored spectroscopically as $Cu(FDDC)_2$ dissolved into the supercritical $CO_2$. Initial extraction rates were again very rapid. In about 20 minutes the $CO_2$ phase was saturated with dissolved metal complex. In this case approximately 80% of the Cu ions could be extracted at a final fluid density of 0.55 g/cm$^3$.

In both Examples I and II, it was found that the metal chelate could be collected in whole by precipitation from the supercritical $CO_2$ by decreasing the pressure of the system. It is also seen that the present invention is useful for removing contaminants from a complex matrix, which is either a solution or solid sample in which are present many different species (including organic and inorganic species).

B. Fluorinated Chelating Agents

EXAMPLE III

This example describes the use of fluorinated chelating agents for SFE according to the present process. In developing the above extraction methods, it was found that fluorination of complexing agents yielded enhanced solubility behaviors of the metal chelates in supercritical $CO_2$. Fluorination of sodium diethyldithiocarbamate (DDC) to form sodium or lithium bis(trifluoroethyl)-dithiocarbamate (FDDC) was found to increase the solubilities of the metal-diethyldithiocarbamates by almost 3 orders of magnitude. For example, $Cu(DDC)_2$ has a UV-Visible determined solubility in supercritical $CO_2$ of $(1.1\pm0.2)\times10^{-6}$ mol/L. Upon the fluorination of the terminal methyl groups of DDC, the solubility of $Cu(FDDC)_2$ in supercritical $CO_2$ was determined to be $(9.1\pm0.3)\times10^{-4}$ mol/L. Another example of increased solubility in supercritical $CO_2$ was obtained with the β-diketone acetylyacetonate (ACAC). The solubility of $Cu(acac)_2$ in supercritical $CO_2$ was substantially increased by forming $Cu(HFACAC)_2$, which is the hexafluoroacetyl acetonate.

The present inventors have found that fluorination of chelating agents favors the extraction of fluorinated metal chelates in supercritical $CO_2$. The behaviors of metal fluorinated diethyldithiocarbamate (FDDC) complexes in supercritical fluid chromatography (SFC) have not previously been reported. This example illustrates the separation of arsenic DDC and FDDC complexes in SFC using $CO_2$ as a mobile phase.

A Lee Scientific Model 602 supercritical fluid chromatograph with a Neslab RTE-100 constant temperature bath was used for all analysis reported in this example. This system was equipped with a timed-split rotary injection valve and an FID. All chromatograms were run using supercritical $CO_2$ as the mobile phase (Matheson) and a 5-meter 100-um ID by 195-um OD SB-Methyl-100 Superbond capillary column (Lee Scientific). The chromatographic signals were recorded and processed using a HP 3390A integrator. The temperature and density conditions for the analysis were computer controlled and are reported below.

The stock solutions (Zn, Ni, Co, Fe, Hg, As, Sb, and Bi) used in this study were Baker Analyzed Reagents from the J.T. Baker Chemical Company. Sodium diethyldithiocarbamate (NaDDC) was purchased from the Fisher Scientific Company. Other chemicals such as chloroform and dichloromethane were purchased from EM Science. Ammonium acetate buffer was prepared by mixing 120 g of glacial acetic acid (J.T. Baker Ultrapure Reagent) and 134 g of concentrated $NH_4OH$ (Aldrich A.C.S. Reagent) and diluting to 1 liter. The pH value was adjusted by drop wise addition of $HNO_3$ and/or $NH_4OH$. Deionized water was prepared by passing distilled water through an ion exchange column (Barnstead ultrapure water purification cartridge) and a 0.2-um filter assembly (Pall Corp, Ultipor DFA). Sodium bis(trifluoroethyl)amine was purchased from PCR Research Chemicals.

The metal-DDC and FDDC complexes were prepared by adding an excess amount of ligand to the metal solutions at the pH indicated in *Anal. Chem* 54:2536 (1982). The resulting precipitates were extracted into chloroform, and the organic phase was washed with deionized water after phase separation. Purification of the metal complexes was done using recrystallization from a chloroform/ethanol solution (1:1 v/v). Other chemicals used in the synthesis, including sodium amide, carbon disulfide, and potassium hydroxide were all obtained from Aldrich Chemical Company. All containers used in the experiments were acid washed, rinsed several times with deionized water, and dried in a class 100 clean hood.

The conditions used for chromatographic separation were an oven temperature of 100° C. with initial $CO_2$ pressure of 100 atm, followed by a 6.50 min hold time with a pressure ramp of 4.0 atm/min to a final pressure of 200 atm. Sample injection time was 0.1 seconds, which amounts to a calibrated 80 nL sample injection. Flame ionization detector (FID) temperature was 325° C. Under these conditions, separation and detection of some metal dithiocarbamate complexes such as $As(DDC)_3$, $Ni(DDC)_2$, $Pb(DDC)_2$, and $Zn(DDC)_2$ were possible. However, judging from the uneven reproducibility of results and broad peak shapes, these particular metal complexes apparently have a lower solubility in supercritical $CO_2$. These difficulties were further compounded by sample decomposition and retention within the column resulting in chromatographic memory and subsequent column contamination.

Fluorination of the ligand changes the chromatographic behavior of these metal chelates. FIG. 3 illustrates this point with a comparison of a sample analyzed by capillary SFC containing the same concentration $(6\times10^{-4}M)$ of $As(FDDC)_3$ and $As(DDC)_3$ with docasane $(C_{22}H_{46})$ being used in this case as an internal standard. The $As(DDC)_3$ peak is typical of metal-DDC complexes, being broader and less reproducible. On the other hand, the $As(FDDC)_3$ peak is sharp and well-defined, with a shorter retention time relative to the corresponding DDC complex. The chromatographic results of $As(FDDC)_3$ were reproducible without any of the column contamination problems that were encountered using DDC.

FIG. 4 shows a series of metal-FDDC complexes that were separated and detected, which includes Zn, Ni, Co, Fe, Hg, As, Sb, and Bi. Peak (a) is NaFDDC, peak (b) is $Zn(FDDC)_2$, peak (c) is $Ni(FDDC)_2$, peak (d) is $Co(FDDC)_3$ peak (e) is $Fe(FDDC)_3$, peak (f) is $Hg(FDDC)_2$, peak (g) is $As(FDDC)_3$, peak (h) is $Sb(FDDC)_3$, and peak (i) is $Bi(FDDC)_3$. The valence of the metal ionic species is the same as the number of FDDC ligands in the chelate. This chromatograph shows the ability of the present method to separate and detect arsenic from a mixture of metal complexes. The detection limit of these metal chelates is generally in the order of 1 ppm. The extraction procedure serves as a preconcentration step for SFC analysis. With a preconcentration factor of 10 to 100, this technique can be used for trace analysis. The percentages of recovery of these trace metals using FDDC extraction are generally <95%.

EXAMPLE IV

This example describes the calculation of the stability constants for certain chelates useful for the present invention. Fluorination of diethyldithiocarbamate has been shown to increase the stability of metal chelates. A numerical value for the enhancement of the stability constant of the arsenic complex was estimated using a competition experiment where $As^{3+}$ was added in a sub-stoichiometric amount to a mixture of equal amounts of Na-DDC and Na-FDDC. In this experiment, the concentration of $As^{3+}$ in the aqueous phase was $2.1\times10^{-3}$ M and the concentrations of each ligand were $2.1\times10^{-2}$ M. After extraction, the organic phase was analyzed by supercritical fluid chromatography (SFC) to determine the relative amounts of $As(FDDC)_3$. The relative stability constants of the two arsenic chelates can be calculated from the following equilibrium relations:

$$As^{3+} + 3\ FDDC^- \rightarrow As(FDDC)_3 \quad (1)$$

$$As^{3+} + 3\ DDC^- \rightarrow As(DDC)_3 \quad (2)$$

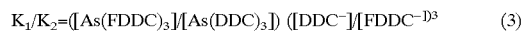
$$K_1/K_2 = ([As(FDDC)_3]/[As(DDC)_3])\ ([DDC^-]/[FDDC^-])^3 \quad (3)$$

Since $[DDC^-]/[FDDC^-]$ equals 1 and $K_2$ has been determined by the inventors $(7.1\times10^{23})$, from the relative concentrations of the two arsenic complexes, $K_1$ can be calculated from equation (3). The value of $K_1$ determined from this experiment is $2.1\times10^{24}$.

EXAMPLE V

The effect of fluorination on the solubility of several metal chelates is explored in this example. In accordance with one aspect of the present invention, the chelating agent is fluorinated to improve the solubility of the metal chelate in the supercritical fluid and enhance metal extraction.

The chelating agents in this example are DDC, FDDC, "H-crown", "F2-crown", and "F6-crown." The structural formulae of these agents are:

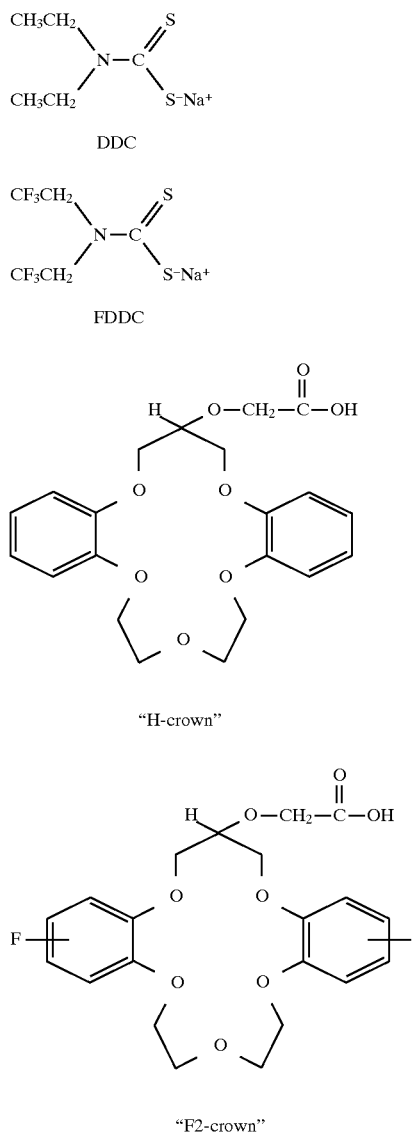

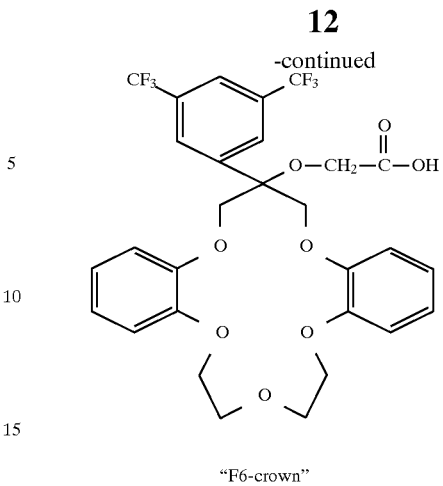

"H-crown" refers to the non-fluorinated molecule, "F2-crown" has two added fluorine atoms, and "F6-crown" has six added fluorine atoms.

Table III shows increases in solubility at the lower pressure/densities of $CO_2$. The solvation power of $CO_2$ at the higher pressures/densities increases significantly such that it is much more like a regular liquid organic solvent at those pressures. At such high pressures, the solubility enhancement from fluorine diminishes. This is advantageous because the solubility increase from fluorination occurs at moderate, easily achievable conditions.

TABLE III

Solubilities of Fluorinated and Non-Fluorinated Metal Chelates in Supercritical $CO_2$ at 100 atm and 50° C.

| Metal Chelate | Solubility | Ratio (FDDC/DDC) |
|---|---|---|
| Na(FDDC) | $(4.7 \pm 0.3) \times 10^{-4}$ | 3.1 |
| Na(DDC) | $(1.5 \pm 0.1) \times 10^{-4}$ | |
| Cu(FDDC)$_2$ | $(9.1 \pm 0.3) \times 10^{-4}$ | 830 |
| Cu(DDC)$_2$ | $(1.1 \pm 0.2) \times 10^{-6}$ | |
| Ni(FDDC)$_2$ | $(7.2 \pm 1.0) \times 10^{-4}$ | 850 |
| Ni(DDC)$_2$ | $(8.5 \pm 1.0) \times 10^{-7}$ | |
| Co(FDDC)$_3$ | $(8.0 \pm 0.6) \times 10^{-4}$ | 330 |
| Co(DDC)$_3$ | $(2.4 \pm 0.4) \times 10^{-6}$ | |
| Bi(FDDC)$_3$ | $(<10^{-7})$ | |
| Bi(DDC)$_3$ | $(1.3 \pm 0.1) \times 10^{-6}$ | |
| BiFDDC)$_3$[a] | $(7.3 \pm 1.0) \times 10^{-4}$ | 81 |
| Bi(DDC)$_3$[a] | $(9.0 \pm 0.6) \times 10^{-6}$ | |

[a]Solubility calculated at 150 atm and 50° C., corresponding to a $CO_2$ density 0.66 g/cm$^3$.

Dithiocarbamate chelating agents are somewhat nonselective for the metal with which a chelate is formed. Fluorination of a dithiocarbamate chelating agent, however has a greater effect on increasing the solubility of transition metal chelates such as Cu, Ni, and Co than on alkali earth metals such as Na.

TABLE IV

Solubility comparison of the lariat crown ethers in supercritical $CO_2$ at 50° C. C

| | Solubilities | | |
|---|---|---|---|
| Pressure/Density | F-6 crown | F-2 crown | H crown |
| 100 atm/0.388 | $(3.0 \pm 2.0)10^{-5}[M]$ | $(7.9 \pm 0.5)10^{-6}[M]$ | $(7.6 \pm 0.7)10^{-6}[M]$ |
| 117 atm/0.528 | $(9.0 \pm 0.4)10^{-5}[M]$ | $(8.4 \pm 0.5)^{-5}[M]$ | $(2.2 \pm 0.2)10^{-5}[M]$ |
| 150 atm/0.662 | $(1.3 \pm 0.1)10^{-4}[M]$ | $(9.9 \pm 0.5)10^{-5}[M]$ | $(7.6 \pm 0.7)10^{-5}[M]$ |
| 200 atm/0.767 | $(1.6 \pm 0.1)10^{-4}[M]$ | $(1.2 \pm 0.1)10^{-4}[M]$ | $(1.2 \pm 0.1)10^{-4}[M]$ |
| 250 atm/0.833 | $(1.8 \pm 0.1)10^{-4}[M]$ | $(1.5 \pm 0.1)10^{-4}[M]$ | $(1.8 \pm 0.2)10^{-4}[M]$ |
| 300 atm/0.883 | $(2.1 \pm 0.1)10^{-4}[M]$ | $(2.1 \pm 0.1)10^{-4}[M]$ | $(2.1 \pm 0.2)10^{-4}[M]$ |
| 350 atm/0.922 | $(2.4 \pm 0.2)10^{-4}[M]$ | $(2.3 \pm 0.1)10^{-4}[M]$ | $(2.7 \pm 0.3)10^{-4}[M]$ |
| 400 atm/0.955 | $(2.9 \pm 0.2)10^{-4}[M]$ | $(2.5 \pm 0.2)10^{-4}[M]$ | $(3.3 \pm 0.3)10^{-4}[M]$ |

% weight of Fluorine in Metal-FDDC Complexes is approximately 40%

Figure 5:
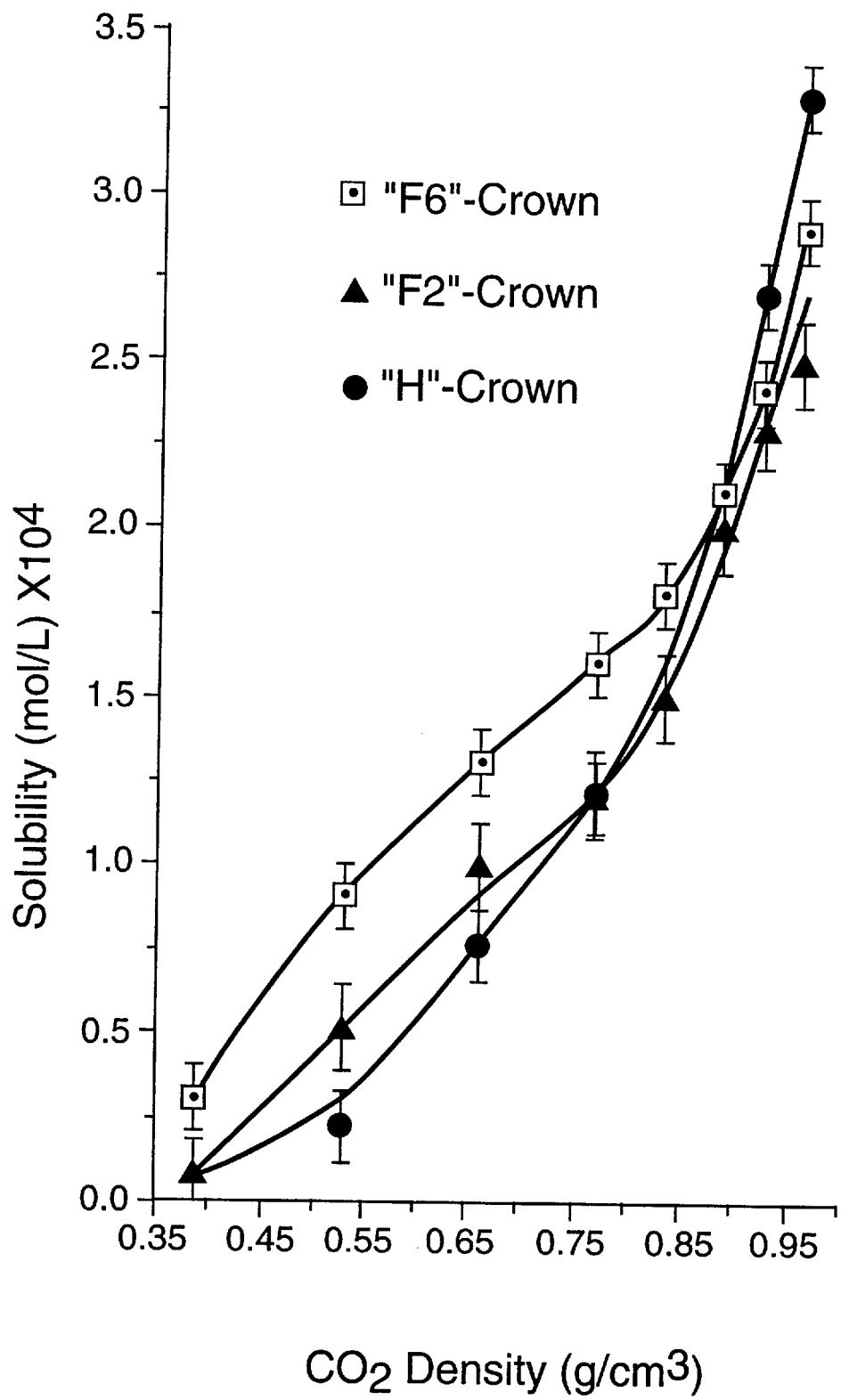
FIG. 5 is a graph comparing solubilities of an unfluorinated lariat crown ether with fluorinated lariat crown ethers.

These solubility characteristics are shown in FIG. 5.

C. Chelate Selectivity

EXAMPLE VI

The crown ethers are generally known as macrocyclic polyethers. Many related compounds have been made involving heterocyclic rings containing 12 to 60 atoms. Crown ethers are particularly useful as chelating agents because they can be made selective for particular ligands. There are, for example, optimum polyether ring sizes for different alkali metal cations. A 15 to 18 member ring has an optimal cavity size for chelating a cation having the radius of sodium; an 18 member ring is optimal for chelating potassium; and an 18 to 21 member ring is most suitable for cesium.

Functional groups on the crown ether also play a role in complexing cations. Some crown ethers with pendant carboxylate functional groups (such as symdibenzo-16-crown-5-oxyacetic acid) are quite efficient and selective for extracting trivalent lanthanide ions. The negatively charged carboxylate group is believed to attract the positively charged lanthanide ions, which are then inserted into a ring having the appropriate cavity size. For lanthanides and actinides, the cavity size is preferably a 16 member crown ether ring. The extraction does not require specific counter anions and is reversible with respect to pH. Lanthanides complexed with the lariat crown ether in an organic solvent can be stripped with a dilute acid to regenerate the chelating agent.

Spectroscopic evidence indicates that both the crown cavity and carboxylate group are involved in the complexation with a lanthanide to ligand ratio of 1:2, suggesting a possible sandwich formation. Experimental results also show that the efficiency of extraction of trivalent lanthanide ions is much greater ($>10^2$) than that of alkali metal ions such as $Na^+$, although the ionic radius of $Na^+$(0.96Å) is similar to those of the lanthanide ions (1.15Å for $La^{+5}$). The reduced efficiency for $Na^+$ has been attributed to the high degree of ionization of $Na^+$ with the carboxylate group of the macrocycle. The crown ether carboxylic acid also shows lower extraction efficiencies for the alkaline earth metal ions ($Ca^{2+}$, $Sr^{2+}$, and $Ba^{2+}$). Thus, the functionalized macrocycles apparently act as bi-functional chelating agents which, with proper design, can be made more selective than the conventional neutral crown ethers.

The lariat crown ether system also shows high extraction efficiency for $Lu^{3+}$ (ionic radius 0.93Å), and even has a selectivity for $Lu^{3+}$ over $La^{3+}$ by as much as an order of magnitude depending on the solvent. The observed selectivity is believed to result from small differences in ionic radius and bonding of the lanthanides with the ligand. Using this type of crown ether carboxylic acid, extraction of uranium and rare earth elements in seawater (with concentrations in the order of parts per billion or less) can be achieved quantitatively.

D. Hydroxamic Acid Crown Ethers

EXAMPLE VII

The crown ethers of the present invention include many hydroxamic acids that are described by the following empirical formula:

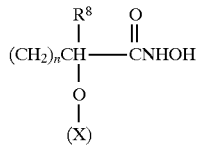

wherein n is an integer of from 0 to 6, X is a dibenzo crown ether of the formula dibenzo-[13+3m]-crown-[4+m]-ether wherein m is an integer of from 0 to about 5 or so and $R_8$ is a lipophilic group which imparts lipophilicity to the hydroxamic acid derivative. The size of the dibenzo crown ether may be varied provided the metal to be extracted fits in the ring such that the donor atoms coordinate to the metal (or to water associated with the metal). However, crown ethers in which the ring size of the crown is too large for a satisfactory host/guest interaction are not suitable. Some preferred dibenzo crown ethers are those in which m is 0, 1 or 2, and are, respectively, dibenzo-13-crown-4 ether, dibenzo-16-crown-5ether, and dibenzo-19-crown-6 ether.

Since the chelating agents of the present invention are useful for the extraction of metal ions of the lanthanide and actinide series and of yttrium and scandium from aqueous medium, the hydroxamic acid derivatives of this invention are preferably lipophilic in order to minimize or even prevent the chelating agent from partitioning in the aqueous phase. Generally, the greater the lipophilicity of the chelating agent, the better the chelating agent will perform. Although R may be hydrogen, it is preferably a lipophilic moiety. Thus, R is preferably a hydrocarbyl group having from 1 to about 18 carbon atoms and is selected from the group consisting of alkyl, cycloalkyl, alkenyl and aryl groups. These groups may also be substituted with other functional groups. For example, if aryl is phenyl, the phenyl may be substituted with electron withdrawing groups such as fluorine, or it may be substituted with electron donating groups such as methoxy. By way of illustration and not in limitation, the phenyl group may be completely substituted with fluorine, such that R is $C_6F_5$ or it may be a 3,5-di-trifluoromethyl phenyl group.

Fluorinated derivatives of hydroxamic acid are believed to be useful in the extraction of lanthanide and actinide metal ions using supercritical carbon dioxide. The solubilities of hydroxamic acid chelates is relatively low in supercritical $CO_2$. Hence, side chain lipophilicity and fluorination are preferred to increase solubility of the chelate in supercritical $CO_2$.

It is believed that R groups of from about 6 to about 10 carbon atoms will sufficiently increase lipophilicity and maximize solubility of the chelate in supercritical $CO_2$. It is also believed that higher extraction efficiency is achieved with R groups of greater lipophilicity, that is, where R is a longer chain hydrocarbon, and that hydroxamic acids in which the R group is aryl are often more selective. The lipophilicity of the side chain should be less important for a more polar supercritical fluid such as $N_2O$.

In another aspect, the dibenzo ether derivatives of hydroxamic acid of the present invention are described by the following empirical formula:

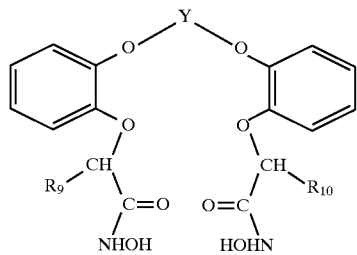
(II)

wherein Y is a member selected from the group consisting of $(CH_2)_3, [[CH_2CH_2O]_n CH_2CH_2]$ wherein n is an integer of from 1 to about 4, and $CH_2CONHCH_2CH_2NHCOCH_2$; and $R_9$ and $R_{10}$, which may be the same or different, are selected from the group consisting of H and a hydrocarbyl group having from 1 to about 18 carbon atoms, which is selected from the group consisting of alkyl, cycloalkyl, alkenyl and aryl groups. As with the hydroxamic acid derivatives represented by formula (I), the R groups are preferably lipophilic when the supercritical fluid is $CO_2$. Further, as with the hydroxamic acid derivatives represented by formula (I) above, these groups may be substituted with other functional groups. Fluorination of these groups would also be preferred when the supercritical fluid is relatively non-polar (such as supercritical carbon dioxide)

In yet another aspect, the present invention provides a bis-dibenzo crown ether derivative of a hydroxamic acid represented by the following empirical formula:

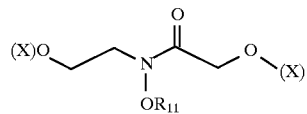

wherein X is a dibenzo crown ether of the formula dibenzo-[13+3m]-crown-[4+m]-ether and m is an integer of from 0 to about 5 or so, and $R_{11}$ is hydrogen or a lipophilic hydrocarbyl group having from 1 to about 18 carbon atoms and is selected from the group consisting of alkyl, cycloalkyl, alkenyl and aryl groups. The R groups may be substituted with other functional groups, preferably fluorine. The dibenzo crown ether X may be the same or different and its size may be varied provided the metal to be extracted fits into the ring to permit chelation. The preferred dibenzo crown ethers are those in which m is 0, 1 or 2, and are, respectively, dibenzo-13-crown-4 ether, dibenzo-16-crown-5 ether and dibenzo-19-crown-6 ether. Fluorination of the benzene rings is especially preferred when the crown ether is to be used with a relatively non-polar supercritical fluid such as $CO_2$.

The present invention further provides a tridentate derivative of a hydroxamic acid represented by the formula:

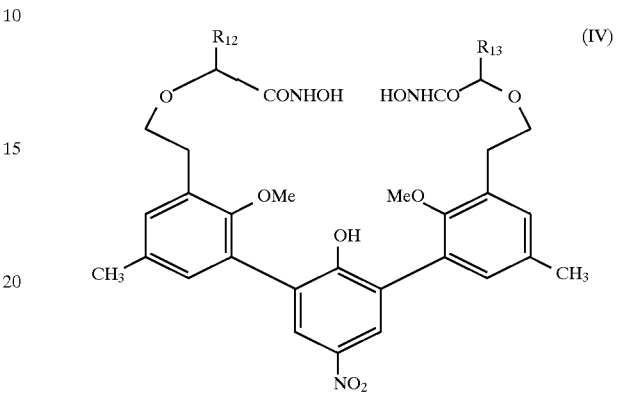
(IV)

where $R_{12}$ or $R_{13}$ may be H, but preferably $R_{12}$ or $R_{13}$ is a lipophilic moiety having of from 1 to about 18 carbon atoms and is selected from the group consisting of alkyl, cycloalkyl, alkenyl and aryl groups. The $R_{12}$, $R_{13}$ groups may be the same or different moieties, and may be substituted with other functional groups, such as fluorine.

Details of the synthesis of specific crown ethers useful in this invention are set forth in co-pending U.S. patent application Ser. No. 07/714,265, filed Jun. 12, 1991, which has been incorporated by reference.

E. Specific Waste-Treatment Embodiment

EXAMPLE VIII

Figure 6:
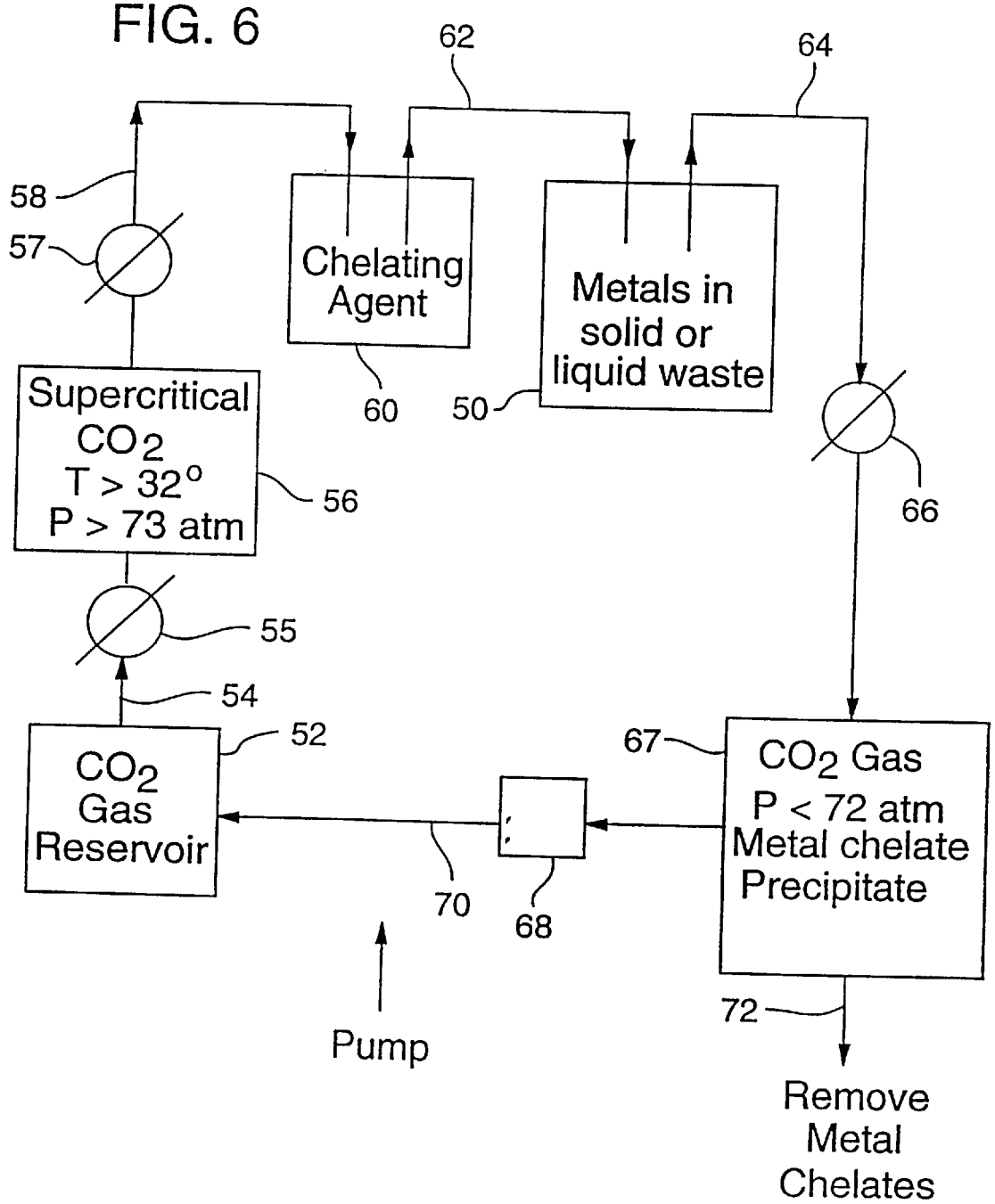
FIG. 6 is a schematic drawing of a waste treatment system in accordance with the present invention.

One proposed embodiment for a continuous selective-chelation supercritical fluid extraction process is illustrated in FIG. 6. This process is suitable for chelating metals that are contained in solid or liquid waste held in a container 50. A supercritical fluid, such as carbon dioxide gas, is supplied from a $CO_2$ gas reservoir 52 which is connected by a conduit 54 containing a valve 55 to a pressurization unit 56 that increases the pressure on the gas to greater than 73 atmospheres at a temperature greater than 32° C. to form supercritical carbon dioxide. The supercritical $CO_2$ then travels through a valve 57 and conduit 58 to a reservoir 60 that holds a solid or liquid chelating agent, such as any of the agents described in the earlier examples of this specification. The $CO_2$ is there passed through a column containing solid or liquid chelating reagent to extract the chelating agent into the supercritical fluid $CO_2$ stream. The supercritical fluid and chelating agent leave reservoir 60 through a conduit 62 and are introduced into container 50.

The supercritical fluid/chelating agent is intimately mixed with the solid or liquid waste in container 50 using either a batch or continuous process. In a batch process, simple mixing would occur through stirring or sonification. Alternatively, mixing could occur by allowing $CO_2$ to flow through a column of solid waste. In a continuous mixing embodiment, $CO_2$ would flow through a column of solid waste material. Continuous mixing with a liquid waste could be achieved with counter current flow.

After mixing, the metal chelate and $CO_2$ is removed through a conduit 64. A depressurizer valve 66 is present in line 64 to reduce the pressure to below seventy-two atmospheres such that the metal chelate precipitates in container

67. The $CO_2$ gas is then recycled by pump 68 through line 70 to gas reservoir 52. Metal chelates can be removed from the bottom of container 67 through line 72 such that the chelating agent can be regenerated from the metal chelate. When regeneration of the chelating agent is desired, metal ions can be stripped from the chelate using a nitric acid solution having a pH less than one.

The extraction system should be thermally controlled, either by known electrical means or immersion in a constant temperature bath. Thermal control allows the carbon dioxide or other supercritical fluid to be maintained above its supercritical temperature.

F. Extraction of Metal Ions with β-Diketones and/or Trialkyl phosphates and Trialkylphosphine Oxides Trivalent metal ions can be extracted by fluid $CO_2$, particularly supercritical $CO_2$, containing β-diketones. Carbon atoms of a ketone are assigned greek letters to designate their position relative to the carbonyl carbon. The first carbon adjacent the carbonyl carbon is designated α, the second such carbon being designated β, and so on. A β-diketone has at least two ketone carbonyls wherein one ketone carbonyl is located on a carbon β to the other ketone functionality. The extraction efficiency appears to be enhanced when the β-diketone is halogenated, particularly when the β-diketone is fluorinated.

A number of fluorinated β-diketones are commercially available from such companies as Aldrich Chemical Company of Milwaukee, Wis. These β-diketones form stable complexes with lanthanides and actinides, and hence are useful ligands for SFE of the f-block elements. Extraction and separation of actinides by supercritical fluids are of particular interest because of the potential applications for nuclear waste analysis and management.

Trialkyl phosphates, such as tributyl phosphate, also function well as ligands for the extraction of metal and metalloids from liquids and solids. This is particularly true for acidic aqueous systems. Mixed ligands, such as β-diketones and trialkyl phosphates, also have been found to be useful for the supercritical fluid extraction of metals and metalloids, particularly the actinides, using $CO_2$. Using a mixture of ligands comprising β-diketones and trialkyl phosphates appears to provide a synergistic extraction capability.

1. Halogenated β-diketones

Several fluorinated β-diketones have been used for the extraction of uranyl and Th(IV) ions using carbon dioxide fluid solvents as shown below in Table V. Except TTA, all other β-diketones tested are liquids at room temperature and at atmospheric pressure.

TABLE V

Fluorinated β-diketones Used for the Extraction of Uranyl and Th (IV) Ions Using Supercritical Carbon Dioxide

| β-Diketone | Abbr. | $R_1$ | $R_2$ | Mol. Wt. | B.P. °C. |
|---|---|---|---|---|---|
| Acetylacetone (760 Torr) | AA | $CH_3$ | $CH_3$ | 100.12 | 139° |
| Trifluoro-acetylacetone | TAA | $CH_3$ | $CF_3$ | 154.09 | 107° |
| Hexafluoro-acetylacetone | HFA | $CF_3$ | $CF_3$ | 208.06 | 70–71° |
| Thenoyltri- (9 Torr) | TTA | Thenoyl | $CF_3$ | 222.18 | 103–104° |
| Heptafluoro-butanoylpivaroylmethane (2.7 Torr) | FOD | $C(CH_3)_2$ | $C_3F_7$ | 296.18 | 33° |

The fluorinated beta-diketones were purchased from the Aldrich Chemical Company of Milwaukee, WI, and were used without further purification.

β-diketones exist in at least two tautomeric forms, the "keto" tautomer and the "enol" tautomer. Tautomerism is a type of isomerism in which migration of a hydrogen atom results in two or more structures called tautomers. β-diketones react with metal ions to form chelates either through the enol tautomer or through an enolate anion (a negatively charged "enol" form of the molecule) illustrated by the following equilibria:

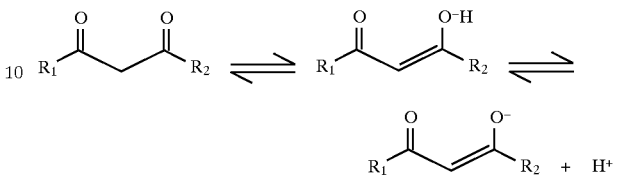

The presence of a small amount of water has been found to significantly increase the $CO_2$ extraction efficiency of metal or metalloid ions from a solid support using fluorinated β-diketones as an extractant. Without limiting the invention to one theory of operation, water molecules likely form adducts with the uranyl/β-diketone complex. This may facilitate the release of the complex from the active sites of the cellulose-based matrix. Therefore, all solid extraction experiments in this study were conducted under wet conditions. One skilled in the art will realize that the amount of water used during the extraction process may vary. However, where about 10 μg of metal ions are to be extracted, it has been determined that at least about 10 μL of water should be added to the system prior to the extraction process. In other words, it appears sufficient to use about 1 μg of water per 1 μg of metal ion.

The following examples describe the extraction of metal and metalloid ions from various media, including both solid and liquid media, using fluorinated β-diketones. These examples are provided solely to illustrate certain preferred embodiments of the invention, and should not be construed to limit the invention to the particular embodiments described. For instance, the examples illustrate the use of fluorinated ligands, but the invention should not be limited to just fluorinated compounds as other halogenated ligands also may perform satisfactorily.

EXAMPLE IX

This example describes the extraction of uranyl and Th(IV) ions from a solid support using only supercritical $CO_2$. The solid support used in this example was a cellulose filter paper obtained from Whatman Ltd. (Maidstone, England). The procedure for extracting the metal ions was substantially as described above in Example II. Uranyl $(UO_2)^{2+}$ and $Th^{4+}$ solutions were prepared from their nitrate salts, which were obtained from Baker Chemical Co. and from Mallinckrodt, Inc. (St. Louis, Mo.), respectively. All other chemicals used were analytical-reagent grade.

Solid samples were prepared by spiking 10 μg each of a mixture of $(UO_2)^{2+}$ and $Th^{4+}$ on pre-washed filter papers (Whatman 42, 0.5 cm×2 cm in size). The filter papers were washed with Ultrex $HNO_3$ and rinsed with deionized water. The spiked filter papers were allowed to air dry at a room temperature of about 23° C. All extractions were conducted with the SFE extraction apparatus described above in Example I or a commercial extraction vessel that is available from Dionex, of Sunnyvale, Calif.

For solid sample extraction, a glass tube (0.5 cm. i.d. and 3 cm. in length) was plugged at one end with a piece of glass wool that was cleaned with Ultrex nitric acid. A spiked sample was added to the open end of the glass tube. Water (10 μl) and about 80 μmole of a ligand were introduced to the sample in that order. The open end of the tube was then plugged with clean glass wool, and the sample tube was then placed in the extraction vessel and installed in an SFE oven. To extract the metal ions from the solid support, the solid samples were subjected to 10 minutes of static extraction followed by 10 minutes of dynamic flushing at 60° C. and 150 atm. These conditions were found satisfactory for the extraction of uranyl ions from the cellulose based filter paper and from sand by supercritical $CO_2$.

In order to determine the amount of metal ions extracted using the process, all samples and standards were irradiated for 2 hours in a 1 MW TRIGAR nuclear reactor at a steady flux of $6 \times 10^{12}$ n cm$^{-2}$s$^{-1}$. After irradiation, the samples were cooled for 24 hours before counting. Each sample was counted for 100 s in a largevolume ORTEC Ge(Li) detector with a resolution (FWHM) of about 2.3 keV at the 1332-keV $^{60}$Co peak. Uranium was determined by the 228 keV gamma emitted during the decay of its daughter $^{239}$Np (2.36 d). Neutron activation of $^{232}$Th produces a short lived radioisotope $^{233}$Th with a half life of 22.2 minutes. Its daughter product, $^{233}$Pa (27 days) further decays to $^{233}$U with the emission of 311 KeV gamma which was used for quantitative determination of thorium.

The results for the extraction of uranyl and Th(IV) ions from the cellulose based filter papers are provided below in Table VI. It is important to note from Table VI that free uranyl and Th(IV) ions cannot be extracted ((2%) by supercritical $CO_2$ in the absence of a ligand.

EXAMPLE X

This example concerns the extraction of uranyl and Th(IV) ions from a solid cellulose support using a β-diketone. In this specific example, acetylacetone (AA) was used as the β-diketone, and the extraction procedure used was substantially as described above in Example IX. Table VI shows that the extraction of metal and/or metalloid ions from a solid support using a non-fluorinated β-diketone provides only limited extraction capability. More specifically, AA extracted only about 10 percent of the uranyl(VI) ions from the solid support, and only about 12 percent of the Th(IV) ions from the support.

EXAMPLE XI

This example describes the extraction of uranyl and Th(IV) ions from a solid cellulose support using FOD (heptafluorobutanoylpivaroylmethane), a fluorinated β-diketone. The extraction procedure used in this example was substantially as described above in Example IX. FOD extracted about 51 percent of the uranyl(VI) ions, and about 80 percent of the Th(IV) ions, from the solid support (Table VI). By comparing the results from the extraction of metal ions using AA, it can be seen that halogenated β-diketones, particularly the fluorinated β-diketones, provide an enhanced capability for extracting metal ions from a solid support using $CO_2$ SFE.

EXAMPLE XII

This example describes the extraction of uranyl and Th(IV) ions from a solid cellulose support using TTA (thenoyltrifluoroacetone). The extraction procedure used in this example was substantially as described above in Example IX. TTA was able to extract about 70 percent of the uranyl(VI) ions, and about 82 percent of the Th(IV) ions. TTA provided the best extraction of metal ions from a solid support using $CO_2$ SFE.

In a manner similar to that described above in Examples XI–XII, Uranyl(VI) and Th(IV) ions have been successfully extracted from solid materials using $CO_2$ SFE. The results of these extractions are presented below in Table VI.

TABLE VI

Extraction of Uranyl and Th (IV) Ions From a Solid Cellulose Support

| β-Diketone | Ligand Amount (µmole) | Percent Extraction (%) U (VI) | Th (IV) |
|---|---|---|---|
| $CO_2$ | | | |
| None | 0 | <2 | >1 |
| FOD | 80 | 51 ± 3 | 80 ± 3 |
| TTA | 80 | 70 ± 3 | 82 ± 4 |
| HFA | 80 | 40 ± 2 | 69 ± 3 |
| TAA | 80 | 15 ± 2 | 22 ± 3 |
| AA | 80 | 10 ± 2 | 12 ± 2 |

*Each solid cellulose sample was 1 cm$^2$ in area and contained 10 µg of U and 10 µg of Th.

From the preceding examples it can be seen that in the presence of the non-fluorinated β-diketone AA, only about 10% of the spiked uranyl ions can be removed by neat $CO_2$ at 60° C. and 150 atm. However, with a fluorinated β-diketone present in the fluid phase, extraction of the spiked uranyl ions in the filter paper by supercritical $CO_2$ is significantly improved. The percent extraction of the spiked uranyl ions by supercritical $CO_2$ varies from about 15% for TAA to about 70% for TTA. The percent extraction of Th(IV) by supercritical $CO_2$ from the cellulose based matrix varies from about 22% for TAA to about 82% for TTA at 60° C. and 150 atm. The extraction efficiencies of the fluorinated β-diketones in supercritical $CO_2$ for Th(IV) ions are higher than those observed for uranyl ions. TTA and FOD appear to be more effective than TAA and HFA for the extraction of the actinide ions by neat supercritical $CO_2$.

EXAMPLE XIII

This example illustrates how modifying the polarity of the fluid phase significantly increases the extraction efficiencies of metal chelates in $CO_2$, particularly supercritical $CO_2$. The procedure employed for this example was substantially as described above for Examples X-XII, except that a 5% methanol modified $CO_2$ was used as the extraction fluid. This mixed solvent was prepared before the metal ions were exposed to the solvent.

With the 5% methanol-supercritical $CO_2$, about 95–98% of the spiked uranyl ions were extracted from solid cellulose supports (Table VII). This is true when any one of the fluorinated β-diketones shown in Table VI is present in the fluid phase. The non-fluorinated ligand, AA, still shows a lower extraction efficiency (45%) relative to the fluorinated β-diketones in methanol-modified $CO_2$ under the same conditions. This also is true for the extraction of Th(IV) by methanol-modified $CO_2$ using fluorinated β-diketones as extractants. Acetylacetone (AA) in methanol modified $CO_2$ can extract Th(IV) up to 58% whereas the fluorinated β-diketones can extract Th(IV) in the 91–97% range under the same conditions.

TABLE VII

Methanol Modified $CO_2$ Extraction Fluid For Extracting Ions From A Solid Cellulose Support

| Ligand | Amount ($\mu$ mole) | Percent Extraction (%) U | Th |
|---|---|---|---|
| | $CO_2$ + 5% Methanol | | |
| FOD | 80 | 98 ± 3 | 97 ± 3 |
| TTA | 80 | 96 ± 3 | 91 ± 3 |
| HFA | 80 | 95 ± 3 | 92 ± 4 |
| TAA | 80 | 98 ± 3 | 95 ± 3 |
| AA | 80 | 45 ± 2 | 58 ± 3 |

*Each solid cellulose sample was 1 cm$^2$ in area and contained 10 $\mu$g of U and 10 $\mu$g of Th.

EXAMPLE XIV

This example describes the extraction of uranyl and Th(IV) ions from aqueous samples. The procedure described in Example I was used in this example as well. Water samples were prepared from a 0.1M $LiClO_4$ solution containing 2.5 $\mu$g/mL each of $(UO_2)^{2+}$ and $Th^{4+}$ at a pH of 3.5 controlled by an acetate buffer (HAc/LiAc). Mine water samples were collected from an open pit uranium mine near Spokane, Wash. For the extraction of ions from water, 4 mL of the spiked water sample were placed in the liquid extraction vessel. The pH of the solution was controlled by an acetate buffer. About 50–100 mg of TTA were loaded in the ligand cylinder and placed upstream from the liquid extraction vessel. The samples were extracted dynamically at 60° C. and 150 atm for 20 minutes. The extraction conditions for real mine waters were slightly modified as specified in Table VIII.

When the extraction was completed, the sample was removed from the extraction vessel and analyzed by NAA (non-destructive neutron activation analysis, which is a technique known to those skilled in the art). A standard solution containing 2.5 $\mu$g/mL each of thorium and uranium was irradiated and counted with the sample under identical conditions. The extraction efficiencies were calculated based on the amounts of thorium and uranium found in the aqueous solution before and after the extraction. The extracted uranyl and Th(IV) complexes in the fluid phase were collected in a glass vial containing 5 mL of chloroform. The solutes trapped in the chloroform solution were determined by backextraction with 50% HNO3 followed by NAA of the acid solution. The results were also used for recovery calculations.

For the extraction of uranyl and Th(IV) ions from water, TTA was chosen as the extractant simply because it is a solid which is easier to handle experimentally than the other $\beta$-diketones. This does not mean that the other ligands do not work for the extraction of metal ions from liquid solutions. The extraction was performed dynamically at 150 atm and 60° C. for 20 minutes. In the absence of a ligand, free uranyl and Th(IV) ions cannot be extracted (<2%) by $CO_2$, or even supercritical fluid $CO_2$. This is true even with 5% methanol in the fluid phase. However, with TTA present in the $CO_2$, the extraction efficiencies for the uranyl and Th(IV) ions are 38% and 70%, respectively (Table VIII).

Table VIII also shows the extraction results using tributyl phosphate (TBP). The empirical formula for TBP is shown below.

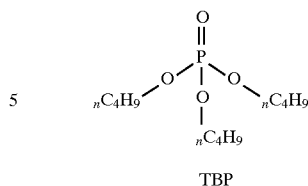

TBP

TBP alone shows low efficiencies (5–6%) for the extraction of uranyl and Th(IV) ions from the aqueous samples.

Table VIII also provides data for extractions using a mixed ligand comprising TBP and TTA. This mixed ligand system is described in more detail below in Section 2, "Synergistic Extraction Using Halogenated $\beta$-Dikestones and Trialkyl phosphates."

TABLE VIII

Extraction of U (VI) and Th (IV) Ions from Aqueous Solution

| Ligand | Percent Extraction (%) U | Th |
|---|---|---|
| | $CO_2$ | |
| TTA | 38 ± 4 | 70 ± 5 |
| TBP | 5 ± 2 | 6 ± 2 |
| TBP + TTA | 70 ± 5 | 87 ± 5 |

*Each water sample was about 4 ml and contained about 2.5 $\mu$g of Th at a pH of about 3.5, which was controlled by using an acetate buffer.

EXAMPLE XV

This example illustrates the benefits obtained in terms of extraction capability when a methanol modifier was used to extract uranyl(VI) and Th(IV) ions from an aqueous solution. In this particular example, TTA was used as the ligand. The procedure used was substantially as described above for Example III.

Table IX shows that the addition of methanol substantially increases the efficiency of the extraction. More specifically, the addition of the methanol solvent modifier increased the extraction efficiency of uranyl (VI) ion from about 38% to 85 percent, and from about 70 percent to about 90 percent for Th(IV) ions. Although the solubility of water in supercritical $CO_2$ is only on the order of about <0.1%, there was a concern that the presence of 5% methanol would increase the solubility of water in the fluid phase. However, the amount of water transported by the methanol-modified fluid phase is estimated to be small, on the order of about one percent. This estimate was based on the fact that no separate aqueous phase was observed in the collection vial containing chloroform which is known to have a solubility of about 1% for water at 20° C.

TABLE IX

Percent Extraction of U (VI) and Th (IV) from an Aqueous Sample Using Methanol-Modified $CO_2$

| | U (VI) | Th (IV) |
|---|---|---|
| | $CO_2$ + 5% MeOH | |
| TTA | 85 ± 5 | 90 ± 5 |

*Each water sample was about 4 ml and contained about 2.5 $\mu$g of Th at a pH of about 3.5, which was controlled by using an acetate buffer.

EXAMPLE XVI

This example describes the extraction of metal ions from a solid sample. Solid samples were prepared by spiking 10

μg each of a mixture of $(UO_2)^{2+}$ and $Th^{4+}$ on sand. The spiked sand was allowed to air dry at a room temperature of 23° C.

For this extraction, a commercial extraction vessel (Dionex, Sunnyvale, Calif.) having a volume of 3.5 mL was used. The experimental conditions for the solid samples of this example were set at 10 minutes of static extraction followed by 10 minutes of dynamic flushing at 60° C. and 150 atm. These conditions were found satisfactory for the extraction of uranyl ions from sand by supercritical $CO_2$.

TTA at an initial concentration of about 80 μmoles has been used as the ligand for extracting U(VI) ions and Th(IV) ions from sand samples. TTA extracted about 72 percent of U(VI) ions from sand, and about 74 percent of the Th(IV) ions present in the sand sample, as shown in Table XI.

2. Extraction Using Halogenated β-diketones and Trialkyl phosphates and/or Trialkylphosphine Oxides The extraction of metal ions from various substrates was described above using halogenated β-diketones, particularly fluorinated β-diketones, and trialkyl phosphates as the ligands for such extractions. Other ligands also have been used for such extractions, as well as mixed ligand compositions. This section describes the extraction of metal ions using supercritical $CO_2$ and a mixed ligand composition comprising β-diketones and trialkyl phosphates.

EXAMPLE XVII

This example illustrates the extraction of metal ions using 80 μmoles of tributyl phosphate. For this extraction procedure, a Whatman filter paper was spiked with 10 μgs of either U(VI) or Th(IV) ions. The extraction procedure was substantially as described above for Examples II and IX.

Table X below shows the results for extracting uranyl(VI) ions and Th(IV) ions from a cellulose solid matrix using tributyl phosphate (TBP) as the sole extractant in supercritical $CO_2$. Although TBP can extract uranyl and thorium ions in supercritical $CO_2$, the extraction is not efficient. For instance, SFE using TBP and $CO_2$ can only extract about 18% of the uranyl ions from the solid support, and only about 8% of the Th(IV) ions. Since TBP is a neutral ligand, anions such as nitrate, acetate, or perchlorate are probably involved in the transport of the uranyl-TBP complex in the fluid phase. These anions are present in the system since the spiked solutions were prepared with uranyl and thorium nitrate in a $LiClO_4$ solution with pH controlled by an acetate buffer.

EXAMPLE XVIII

This example illustrates the extraction of metal ions using a mixed ligand comprising a trialkyl phosphate, such as tributyl phosphate, and a β-diketone. For this extraction procedure, a Whatman filter paper was spiked with 10 μgs of either U(VI) or Th(IV) ions. After that, 40 μmoles of TBP and 40 μmoles of a fluorinated β-diketone were added to the sample in this order. The procedure used for this example was substantially as described above for Examples IX and XVII. The β-diketones selected for this example included FOD, TTA, HFA, TAA and AA. Equimolar amounts of the two ligands have been found to provide enhanced extraction capability. For instance, when TTA was used in combination with TBP as the extractant, an equal molar amount, such as about 40 μmol, of each component was used to perform the extraction. However, this does not mean that only equimolar amounts of the ligand are suitable for forming the mixed ligand systems of the present invention. Currently, it is believed that from about 25 mole percent to about 75 mole percent, preferably about 50 mole percent, of the trialkyl phosphate or trialkylphosphine oxide can be used in combination with the β-diketone to provide a useful and efficient mixed-ligand system.

The results of extractions with mixed ligands are shown below in Table X.

TABLE X

Extraction of U (VI) and Th (IV) from a Solid Cellulose Support Using $CO_2$ SFE, TBP and β-Diketones

| Ligand | Ligand Amount (μmole) | Percent Extraction (%) U | Percent Extraction (%) Th |
|---|---|---|---|
| TBP | 80 | 18 ± 3 | 8 ± 2 |
| TBP + FOD | 40 + 40 | 98 ± 4 | 95 ± 4 |
| TBP + TTA | 40 + 40 | 94 ± 4 | 92 ± 4 |
| TBP + HFA | 40 + 40 | 98 ± 5 | 98 ± 4 |
| TBP + TAA | 40 + 40 | 80 ± 4 | 70 ± 4 |
| TBP + AA | 40 + 40 | 57 ± 3 | 30 ± 3 |

*Each solid cellulose sample (1 $cm^2$ in area) contains 10 μg of U and 10 μg of Th.

An important observation from Table X is that when TBP is mixed with a fluorinated β-diketone the extraction efficiency for uranyl ions is strikingly increased relative to those of the individual ligands. For instance, the extraction efficiency of TBP+FOD for uranyl ions is up to about 98% compared with about 18% and 51% for individual TBP and FOD, respectively. This also is true for the TBP+TTA and the TBP+HFA mixed ligands. The extraction efficiency for uranyl ions is 94% for the former and 96% for the latter. The extraction efficiencies for Th(IV) by supercritical $CO_2$ containing TBP and one of the three β-diketones (FOD, TTA, and HFA) are also high, in the range of 92–98%. Only TAA shows a lower synergistic effect with TBP for the extraction of uranyl and Th(IV) ions relative to the other fluorinated β-diketones given in Table X. The extraction efficiencies for the actinides by neat supercritical $CO_2$ containing the mixed ligands are comparable to those observed for the methanol-modified $CO_2$ containing the fluorinated β-diketones as the extractant. The synergistic approach has the advantage of avoiding the use of an organic solvent, such as methanol, in the SFE process.

The synergistic extraction of the actinide ions by TBP and TTA also was observed for the liquid samples (Table VIII). The extraction efficiencies for the uranyl and Th(IV) ions were raised to 70% and 87%, respectively, using the mixed TBP+TTA ligands in supercritical $CO_2$. Using 5% methanol modified $CO_2$ as the fluid, the extraction efficiencies for the uranyl and Th(IV) ions were 85% and 90%, respectively, at 60° C. and 150 atm after 20 minutes of dynamic extraction with TTA as an extractant.

EXAMPLE XIX

This example concerns the extraction of Uranyl and Th(IV) ions from sand using the synergistic extraction procedure discussed above in Example XVIII. The procedure used for this extraction was substantially as described above in Examples IX and XVI. Table XI below illustrates the results of such extractions with neat supercritical $CO_2$ containing TTA, TBP, and mixed TTA+TBP at 60° C. and 150 atm. Positive synergistic extractions of uranyl and Th(IV) ions also were found in this system for the mixed ligands. The extraction efficiency for uranyl ions with TTA+TBP is 94% compared with 72% for TTA and 15% for TBP, individually. A similar synergistic effect is also observed for the extraction of Th(IV) from sand.

TABLE XI

Extraction of U (VI) and Th (IV) from Sand with Neat Supercritical $CO_2$ Containing TTA, TBP and TBP + TTA at 60° C. and 150 Atmospheres

| Ligand | Ligand Amount (µmole) | Percent Extraction (%) U | Th |
|---|---|---|---|
| TBP | 80 | 72 ± 4 | 74 ± 5 |
| TBP | 80 | 15 ± 4 | 10 ± 3 |
| TBP + TTA | 40 + 40 | 94 ± 5 | 93 ± 5 |

*Each sand sample was about 200 mg and contained about 10 µg of Th.

EXAMPLE XX

Uranyl ions also have been extracted from natural aqueous samples using the mixed ligand approach. The aqueous samples were mine waters collected from the Northwest region. The uranium concentrations in two mine waters tested were 9.6 µg/mL and 18 µg/mL. The mine waters were extracted with a 1:1 molar mixture of TTA+TBP in neat $CO_2$ at 60° C. and 150 atm for a static time of 10 minutes followed, by 20 minutes of dynamic extraction. Under these conditions, the percent extraction of uranium from these samples were 81±4% and 78±5%, respectively, for triplicate runs (Table XII).

The contaminated mine waters also were added to a top-soil sample collected from northern Idaho. The contaminated soil samples were dried at room temperature prior to conducting the SFE experiments. The results of the extraction of uranium from the contaminated soil samples with a 1:1 mixture of TTA+TBP or HFA+TBP in supercritical $CO_2$ at 60° C. and 150 atm also are given in Table XII. The percent extraction of uranium with HFA+TBP for both soil samples A and B is about 90%, whereas TTA+TBP shows lower percent extractions (77–82%) of uranium under the same conditions.

TABLE XII

Extraction of Uranyl Ions form Mine Waters and From Contaminated Soils

| Sample | U Concentration | Ligands | Percent Extraction (%) |
|---|---|---|---|
| Mine Water A | 9.6 µg/mL | TTA + TBP | 81 ± 4 |
| | | TTA + TOPO | 97 ± 3 |
| Mine Water B | 18.0 µg/mL | TTA + TBP | 78 ± 5 |
| Soil A | 63 µg/100 mg | HFA + TBP | 91 ± 4 |
| | | TTA + TBP | 82 ± 5 |
| | | HFA + TOPO | 94 ± 5 |
| Soil B | 15.4 µg/100 mg | HFA + TBP | 89 ± 5 |
| | | TTA + TBP | 77 ± 4 |
| | | HFA + TOPO | 98 ± 3 |

*For mine water extractions: 4 ml sample, 200 mg each of TTA and TBP; For the soil extractions: 100 mg sample, 200 µmole each of TTA and TBP or of HFA and TBP. The extraction conditions were about 10 minutes of static extraction, followed by 20 minutes of dynamic extraction The examples provided above demonstrate that uranyl and Th(IV) ions, whether dissolved in an aqueous solvent or adsorbed on solid materials such as a cellulose support or sand, can be efficiently extracted using supercritical $CO_2$ containing a halogenated β-diketone, preferably a fluorinated β-diketone. A binary mixture consisting of tri-n-octylphosphine oxide (TOPO) and a fluorinated β-diketone is slightly more effective than a binary mixture of TBP and a fluorinated β-diketone for the extraction of uranyl and Th(IV) ions from the mine waters and contaminated soil samples as shown in Table XII. The structure of TOPO is given below, wherein $R_6$–$R_8$ are n-octyl groups, although it will be understood by those skilled in the art that $R_6$–$R_8$ also may be selected from the group consisting of lower alkyl groups.

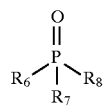

Uranium and thorium are usually extracted from these solids using strong acids for dissolution followed by various separation techniques. To enhance the dissolution of actinides from solids with complex matrices, fluorinated acids may be used in supercritical $CO_2$. The matrix interferences may be minimized using selective chelating agents. The novel SFE technique, which uses fluorinated β-diketones as extractants, and the synergistic effects obtained with trialkyl phosphates, offers numerous applications for the separation of metal and metalloid ions from solid and liquid materials.

EXAMPLE XXI

This example describes the extraction of lanthanides [such as La(III), Eu(III) and Lu(III)] from a solid matrix using supercritical carbon dioxide and a binary mixture of TBP and a fluorinated β-diketone. The fluorinated β-diketones were obtained from Aldrich Chemical Company. Solutions of $La^{3+}$, $Eu^{3+}$ and $Lu^{3+}$ were prepared from the nitrate salts, which were obtained from Aldrich. Solid samples were prepared by spiking 10 µg each of a mixture of the ions on prewashed filter paper or sand. The spiked samples were allowed to air dry at room temperature. The weight of the dry sand samples was about 300 mg. All the experiments were conducted using the apparatus of FIG. 1 and as described in Example I.

Table XIII shows the results of extracting $La^{3+}$, $Eu^{3+}$ and $Lu^{3+}$ from sand using neat supercritical carbon dioxide containing TTA, TBP and mixed TTA/TBP at 60° C. and 150 atm. Synergistic extraction of the lanthanides is again observed in this system when TTA is mixed with TBP. The extraction efficiencies of the $La^{3+}$, $Eu^{3+}$ and $Lu^{3+}$ in sand are 91%, 92% and 95%, respectively, when the carbon dioxide contained an equal molar mixture of TBP and TTA. The percent extraction represents the amount of a lanthanide removed from the solid matrix. The percent recovery represents the amount of the lanthanide trapped in the chloroform solution.

TABLE XIII

Percent Extraction and Recovery of $La^{3+}$, $Eu^{3+}$, and $Lu^{3+}$ from Sand* with Neat $CO_2$ Containing TTA, TBP, and Mixed TTA + TBP at 60° C. and 150 Atm

| ligand | amt (μmol) | percent extraction (%) | | | percent recovery (%) | | |
|---|---|---|---|---|---|---|---|
| | | La | Eu | Lu | La | Eu | Lu |
| TTA | 80 | 40 ± 3 | 51 ± 3 | 65 ± 4 | 29 ± 3 | 40 ± 3 | 60 ± 4 |
| BBP | 80 | 4 ± 2 | 3 ± 1 | 5 ± 2 | 2 ± 1 | 2 ± 1 | 3 ± 1 |
| TTA + TBP | 40 + 40 | 91 ± 3 | 92 ± 4 | 95 ± 4 | 91 ± 3 | 89 ± 4 | 91 ± 4 |

*Each sand sample (300 mg by weight) contains 10 μg each of $La^{3+}$, $Eu^{3+}$, $Lu^{3+}$. 10 min static extraction followed by 20 min of dynamic extraction.

EXAMPLE XXII

This example describes the extraction of lanthanides [such as La(III), Eu(III) and Lu(III)] from an aqueous matrix using supercritical carbon dioxide and a binary mixture of TBP and a fluorinated β-diketone. The fluorinated β-diketones were obtained from Aldrich Chemical Company. Solutions of $La^{3+}$, $Eu^{3+}$ and $Lu^{3+}$ were prepared from the nitrate salts, which were obtained from Aldrich. For the extraction of lanthanides from water, 4 ml of the spiked water sample was placed in a liquid extraction vessel. The pH of the solutions was controlled by an acetate buffer. The water sample typically contained about 2.5 μg/ml each of $La^{3+}$, $Eu^{3+}$ and $Lu^{3+}$. About 50 mg of a ligand, such as TTA, was loaded in the ligand cylinder placed upstream from the liquid extraction vessel. The samples were extracted dynamically at 60° C. and 150 atm. for a period of about 20 minutes. When the extraction was complete the sample was removed and analyzed by NAA. A standard solution containing 2.5 μg/ml each of the lanthanide ions was irradiated and counted with the sample under identical conditions.

The results of these extractions are provided below in Table XIV. Without the ligand, the lanthanide ions in the aqueous phase cannot be extracted (les than about 2%) by supercritical carbon dioxide even with 5% methanol present in the fluid phase. With TTA present in the fluid phase, the extraction efficiencies of the $La^{3+}$, $Eu^{3+}$ and $Lu^{3+}$ are 30%, 38% and 51% percent respectively. Using methanol as a modifying solvent increased the extraction efficiencies to 70%, 78% and 81%.

The synergistic extraction of the lanthanides from the aqueous solution by a mixture of TTA and TBP in supercritical carbon dioxide also is illustrated in Table XIV. TBP alone in supercritical carbon dioxide shows low extraction efficiencies for the lanthanides (less than about 12%). When a mixture of TBP and TTA is used the extraction efficiencies are increased to 75%, 86% and 89% for $La^{3+}$, $Eu^{3+}$ and $Lu^{3+}$, respectively.

TABLE XIV

Percent Extraction of $La^{3+}$, $Eu^{3+}$, and $^{3+}$ from Aqueous Solution with Supercritical $CO_2$ Containing TTA at 150 Atm and 60° C.

| ligand | fluid phase | percent extraction (%) | | |
|---|---|---|---|---|
| | | $La^{3+}$ | $Eu^{3+}$ | $Lu^{3+}$ |
| none | $CO_2$ | <2 | <2 | <2 |
| none | $CO_2$ + 5% MeOH | <2 | <2 | <2 |
| TTA | $CO_2$ | 30 ± 3 | 38 ± 4 | 51 ± 4 |
| TTA | $CO_2$ + 5% MeOH | 70 ± 3 | 78 ± 4 | 81 ± 3 |
| TBP | $CO_2$ | 7 ± 2 | 11 ± 3 | 12 ± 3 |
| TBP + TTA | $CO_2$ | 75 ± 3 | 86 ± 4 | 89 ± 3 |

*Each water sample (4 mL) contains 2.5 μg/mL of $La^{3+}$, $Eu^{3+}$, and $Lu^{3+}$ each at pH 4.0 controlled by an acetate buffer.

G. $CO_2$ Fluid Extraction of Metals and/or Metalloids from Acidic Media

One specific embodiment of the present invention is the removal of radioactive ions from solid and liquid materials. For instance, the described SFE process can be used to extract actinides in acid solutions such as those produced by the PUREX process (Plutonium Uranium Recovery by Extraction). In the PUREX process, nuclear fuel material is first dissolved in hot nitric acid followed by extraction of the dissolved uranium and plutonium with an organic solvent containing 20–30% of TBP in kerosene or in n-dodecane. Supercritical fluid extraction of metals and metalloids in acid solutions using carbon dioxide also has proven useful.

EXAMPLE XXIII

This example concerns the extraction of U(VI), Th(IV) and Nd(III) from 6 molar nitric acid ($HNO_3$). The procedure used for the extraction was substantially as described above in Example XIV. The ligands used for this example included TBP and TTA, as well as TOPO and TTA. For the TBP experiments, the ligand ( 5 ml TBP) was placed in a stainless steel vessel with supercritical carbon dioxide bubbled from the bottom of the vessel. In this arrangement, the fluid phase is saturated with TBP. For the extractions with a binary mixture of TBP and TTA, supercritical carbon dioxide was first saturated with TBP using the method described above. The fluid phase then passed through a second ligand cell containing 100 mg of TTA. After this, the supercritical fluid, saturated with both TBP and TTA, was led into a liquid extraction cell from the bottom. The extraction conditions were 15 minutes static extraction followed by 15 minutes of dynamic extraction at 60° C. and 150 atm. The supercritical conditions were 60° C. and 150 atmospheres. The results of these extractions are presented below in Table XV, which shows that the mixed ligand composition provides a novel and efficient means for removing radioactive ions from acidic solutions, without using toxic or flammable organic chemicals for the extraction process. Thus, the present invention provides an attractive alternative for the PUREX process.

TABLE XV

Extraction of U (VI), Th (VI), and Nd (III) from 6 M Nitric Acid with Supercritical $CO_2$ and Mixed Ligands

| Ligands | % Extraction | | |
|---|---|---|---|
| | U | Th | Nd |
| TBP | 91 | 89 | 67 |
| TBP + TTA | 95 | 82 | 75 |
| TBP + TTA | 97 | 91 | 77 |
| TOPO + TTA | 99 | 99 | 73 |
| a. Sample composition: | 50 μg/mL each of U, Th, and Nd in 6M $HNO_3$ + 3M $LiNO_3$ | | |
| b. Extraction conditions: | 15 min static plus 15 min dynamic extraction at 60° C. and 150 atm. | | |

This example and the results provided in Table XV show that TBP alone can extract uranyl, Th(IV) and Nd(III) in 6 m $HNO_3$ with a reasonably high efficiency at 60° C. and 150 atm. Without limiting the extraction of metal and/or metalloid ions from acidic solutions to one theory of operation, it appears that these ions are extracted as the neutral nitrates $UO_2(NO_3)_2$, $Th(NO_3)_4$ and $Nd(NO_3)_3$ in supercritical carbon dioxide because of the high nitrate concentration in 6M $HNO_3$. Using a binary mixture of TBP and the fluorinated β-diketone TTA, the extraction efficiencies of uranyl, Th(IV) and Nd(III) in the acid solution by supercritical carbon dioxide are enhanced. These results show that the actinides and lanthanides (Nd(III) is a typical lanthanide) can be extracted from acid solutions, particularly nitric acid solutions, on an industrial scale using supercritical carbon dioxide as a solvent.

In summary, Example XVII shows that lanthanides and actinides can be extracted from acidic solutions, such as 6M $HNO_3$, using TBP in supercritical carbon dioxide. A binary mixture of TBP and a fluorinated β-diketone, or TOPO and a fluorinated β-diketone, in supercritical carbon dioxide can enhance the extraction efficiencies of the lanthanides and the actinides from acidic solutions. As a result, carbon dioxide can be used, either in a supercritical state or as a subcritical liquid under pressure, to replace the use of organic solvents, such as kerosene, for the extraction of lanthanide and actinides from acidic solutions.

The triple point of carbon dioxide is 5.1 atm and −56.3° C. Therefore, at room temperature carbon dioxide becomes a liquid above 5.1 atm. Depending on the pressure, liquid carbon dioxide has a density comparable or slightly greater than supercritical carbon dioxide, thus the solvation power of liquid carbon dioxide is comparable to that of supercritical carbon dioxide. This means liquid carbon dioxide should also be able to dissolve the metal complexes described above. However, liquid carbon dioxide does not have the "gas-like" properties of the supercritical carbon dioxide. This means liquid carbon dioxide has a large viscosity, small diffusivity, and consequently poor penetration power compared with the supercritical carbon dioxide. Thus, it is expected that liquid carbon dioxide should also be able to extract lanthanides and actinides from acid solutions with TBP or a mixture of TBP and a fluorinated β-diketone as the extractant, but with lower efficiencies. The extraction efficiency of liquid carbon dioxide is expected to depend on the applied pressure. It is also expected that the extraction efficiency of liquid carbon dioxide can be improved with mechanical stirring and agitation.

The following Examples XXIV-XXVII concern the extraction of metal or metalloid species from acidic solutions using primarily organic phosphate or organic phosphine oxides as the extracting agents. The preceding examples indicated that TBP alone, and TBP or other extracting agents in combination with β-diketones, efficiently extract metal or metalloid species from acidic environments. The following examples demonstrate that mixtures of extracting agents that include β-diketones are not necessarily required for the efficient extraction of metal or metalloid species from acidic mixtures. The results obtained from Examples XXIV-XXV are summarized below in Table XVI.

EXAMPLE XXIV

This example describes the extraction of U(VI) and Th(IV) from an acidified aqueous matrix using supercritical carbon dioxide and tributylphosphine oxide (TBPO) as a chelating agent. U(VI) and Th(IV) were prepared from their nitrate salts obtained commercially from such distributors as Baker Chemical Co. and Mallinckrodt Inc. All acidic solutions, regardless of the acid concentration, contained about 50 μg/ml each of U(VI) and Th(IV). For this particular example, the acidic solution was 6M $HNO_3$ and 3M $LiNO_3$. TBPO was obtained from Aldrich Chemical Company. All other chemicals used were analytical reagent grade.

All experiments were performed with a lab-built SFE extraction apparatus as described above. TBPO is a solid extraction reagent, and was placed in a 3.5 mL high pressure cylinder connected upstream of the liquid extraction vessel. A fused-silica tubing (Dionex, 50 um i.d. and 20 cm in length) was used as the pressure restriction for the exit gas. Supercritical $CO_2$ was introduced through the upstream cylinder containing TBPO and then introduced through the extraction vessel containing the acidic solution of U(VI) and Th(IV). The ions were complexed and extracted under static conditions for about 15 minutes, and then under dynamic conditions for 15 minutes. The supercritical conditions were 60° C. and 200 atm. The amount of U(VI) and Th(IV) ions extracted were determined as described above.

The results of this extraction procedure are provided below in Table XVI. More specifically, TBPO extracted U(VI) from this acidic environment with greater than 99% efficiency. TBPO extracted Th(IV) from this acidic environment with an average efficiency of about 97.5 percent. Thus, these results show that actinides can be extracted efficiently from an acidic solution using organic phosphine oxides in supercritical carbon dioxide.

In a manner similar to that described in Example XXIV, TBPO has been used to extract U(VI) and Th(IV) ions from various acidic solutions. These results also are summarized in Table XVI. TBPO in supercritical carbon dioxide efficiently extracted U(VI) from 6M $HNO_3$ without added nitrate salts at an average efficiency of about 98.5%. TBPO in supercritical carbon dioxide extracted Th(IV) from 6M $HNO_3$ without added nitrate salts with an average efficiency of about 98%. When the concentration of the acid was reduced to 1M $HNO_3$, U(VI) was extracted with an average efficiency of about 99%, and Th(IV) was extracted with an average efficiency of about 99.5%. Finally, when the concentration of the acid was reduced to 0.1M, TBPO extracted U(VI) with an average efficiency of about 93%, and Th(IV) with an average efficiency of about 92%. Thus, Table XVI clearly demonstrates that TBPO efficiently extracts metal and/or metalloid species from acidic solutions, without the need for using additional extracting agents such as β-diketones.

EXAMPLE XXV

In a manner similar to that described in Example XXIV, a number of organic phosphate and organic phosphine oxide extracting agents have been tested, including TBP, tri-n-octylphosphine oxide (TOPO) and triphenylphosphine oxide (TPPO). Again, the metal ions were U(VI) and Th(IV). These ions were extracted from 6M $HNO_3$ and 3M $LINO_3$, 6M $HNO_3$, 1M $HNO_3$ and 0.1M $HNO_3$ using supercritical carbon dioxide. U(VI) and Th(IV) were prepared from their nitrate salts obtained commercially from such distributors as Baker Chemical Co. and Mallinckrodt Inc. All acidic solutions, regardless of the acid concentration, contained about 50 $\mu$g/ml each of U(VI) and Th(IV). TBP, TOPO and TPPO were obtained from Aldrich Chemical Company. All other chemicals used were analytical reagent grade. The ions were complexed and extracted under static conditions from each of the acidic test environments for about 15 minutes, and then under dynamic conditions for about 15 minutes. The supercritical conditions were 60° C. and 200 atm. The amount of uranium and thorium ions extracted were determined as described above.

The results from these extraction procedures also are provided in Table XVI. These results show that actinides were efficiently extracted from acidic solutions using both organophosphate and organophosphine oxides in supercritical carbon dioxide. Extraction utilizing the lower alkylphosphate compounds alone, such as TBP, is especially convenient because TBP is a relatively inexpensive chelating agent. TBP is a liquid and is highly soluble in supercritical carbon dioxide, and therefore is easily mixed with samples requiring extraction.

TABLE XVI

| Sample Matrix | Extraction Reagent | Percent Extraction (%) U (VI) | Th (IV) |
|---|---|---|---|
| 6M HNO3 + 3M LiNO3 | TBP | 98 | 93 |
| | TBP | 99 | 92 |
| | TBPO | 99 | 98 |
| | TBPO | 99 | 97 |
| | TOPO | 99 | 98 |
| | TOPO | 99 | 100 |
| | TPPO | 99 | 88 |
| | TPPO | 97 | 85 |
| | TTA | 02 | 03 |
| 6M HNO3 | TBP | 91 | 80 |
| | TBP | 89 | 83 |
| | TBPO | 99 | 98 |
| | TBPO | 98 | 98 |
| | TOPO | 100 | 97 |
| | TOPO | 99 | 98 |
| | TPPO | 97 | 70 |
| | TPPO | 99 | 68 |
| | TTA | 05 | 03 |
| | TTA | 00 | 01 |
| 1M HNO3 | TBP | 52 | 26 |
| | TBP | 50 | 28 |
| | TBP + TTA | 70 | 85 |
| | TBP + TTA | 70 | 86 |
| | TBPO | 99 | 99 |
| | TBPO | 99 | 100 |
| | TOPO | 100 | 100 |
| | TOPO | 97 | 96 |
| | TPPO | 97 | 30 |
| | TPPO + TTA | 99 | 86 |
| | TPPO + TTA | 99 | 94 |
| | TTA | 04 | 12 |
| 0.1M HNO3 | TBP | 12 | 20 |
| | TBP | 14 | 26 |
| | TBP + TTA | 87 | 96 |
| | TBP + TTA | 88 | 96 |

TABLE XVI-continued

| Sample Matrix | Extraction Reagent U (VI) | Percent Extraction (%) Th (IV) |
|---|---|---|
| | TBPO | 97 | 91 |
| | TOPO | 89 | 93 |
| | TOPO | 95 | 97 |
| | TPPO | 94 | 29 |
| | TPPO | 90 | 20 |
| | TTA | 24 | 65 |

*TBP: Tributyl phosphate
TBPO: Tributylphosphine oxide
TOPO: Tri-n-octylphosphine oxide
TPPO: Triphenylphosphine oxide
TTA: Thenoyltrifluoroacetone

EXAMPLE XXVI

This example describes the possible extraction of U(VI) and Th(IV) ions from acidified aqueous matrices (including, but not limited to, 6M $HNO_3$, with or without the addition of a nitrate salt, 1M $HNO_3$ and 0.1M $HNO_3$, using supercritical carbon dioxide and di-n-butylphenylphosphine oxide. U(VI) and Th(IV) may be prepared from their nitrate salts obtained commercially. All acidic solutions of different acid concentration should contain about 50 $\mu$g/ml each of the U(VI) and Th(IV) ions.

This example would show that actinides may be extracted from acidic solutions using supercritical carbon dioxide and organophosphine oxides having mixed ligands, that is both alkyl and aryl ligands attached to the same phosphorous atom, with high efficiency. The results should be similar to that shown in Table XVI. The addition of a nitrate salt would be expected to enhance the extraction efficiency when organophosphine oxides having mixed ligands are used as the extracting agent.

EXAMPLE XXVII

This example describes the possible extraction of U(VI) and Th(IV) ions from acidified aqueous matrices (such as 6M $HNO_3$, with or without the addition of a nitrate salt, 1M $HNO_3$ and 0.1M $HNO_3$) using supercritical carbon dioxide and di-n-butyl-phenylphosphate. U(VI) and Th(IV) may be prepared from their nitrate salts obtained commercially. All acidic solutions of different acid concentration should contain about 50 $\mu$g/ml each of the U(VI) and Th(IV) ions.

This example would show that actinides may be extracted from acidic solutions with an efficiency comparable to that shown in Table XVI using supercritical carbon dioxide and organophosphates having mixed ligands, that is both alkyl and aryl ligands attached to the same phosphorous atom. The addition of a nitrate salt would be expected to enhance the extraction efficiency when organophosphate having mixed ligands are used as the extracting agent.

Having illustrated and described the principles of the invention in several preferred embodiments, it should be apparent to those skilled in the art that the invention can be modified in arrangement and detail without departing from such principles. We claim all modifications coming within the spirit and scope of the following claims.

We claim:

1. A method for extracting metal and/or metalloid species from an aqueous acidic media comprising exposing the media to supercritical carbon dioxide, a salt and at least one chelating agent selected from the group consisting of trialkyl phosphates, triaryl phosphates, alklaryl phosphates, trialkylphosphine oxides, triarylphosphine oxides, alkyl-arylphosphine oxides, and mixtures thereof, at least one of the chelating agents forming chelates with the species, the chelates being soluble in the carbon dioxide.

2. The method according to claim 1 comprising exposing the media to at least one trialkyl, triaryl, or alkyl-arylphosphate chelating agent represented by the formula

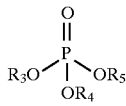

wherein $R_3$–$R_5$ are independently selected from the group consisting of lower alkyl groups and aryl groups, and wherein the trialkylphosphine oxide, triarylphosphine oxide and alkyl-arylphosphine oxide are represented by the formula

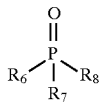

wherein $R_6$–$R_8$ are independently selected from the group consisting of lower alkyl groups and aryl groups.

3. The method according to claim 2 wherein $R_3=R_4=R_5$.
4. The method according to claim 2 wherein $R_6=R_7=R_8$.
5. The method according to claim 2 wherein $R_3$–$R_5$ are independently selected from the group consisting of butyl, octyl, and mixtures thereof, and wherein $R_6$–$R_8$ are independently selected from the group consisting of butyl, octyl, phenyl, and mixtures thereof.
6. The method according to claim 5 wherein $R_3=R_4=R_5$ and wherein $R_6=R_7=R_8$.
7. The method according to claim 1 wherein the exposing step comprises continuously flowing supercritical carbon dioxide through solid or liquid.
8. The method according to claim 1 wherein the media is an acidic solution.
9. The method according to claim 8 wherein the solution is a nitric acid solution, and the salt is a nitrate salt.
10. The method according to claim 1 comprising exposing the media to at least one chelating agent selected from the group consisting of tributyl phosphate, triphenyl phosphate, tributylphosphine oxide, tri-n-octylphosphine oxide, triphenylphosphine oxide, and mixtures thereof.
11. The method according to claim 1 comprising exposing the media to at least one chelating agent selected from the group consisting of tributyl phosphate, triphenyl phosphate, tributylphosphine oxide, tri-n-octylphosphine oxide, triphenylphosphine oxide, and mixtures thereof.
12. The method according to claim 1 and further comprising adding a modifying solvent to the carbon dioxide, wherein the modifying solvent is selected from the group consisting of water, lower alkyl alcohols, and mixtures thereof.
13. The method according to claim 1 and further comprising exposing the acidic media to a β-diketone chelating agent.
14. A method for extracting metal and/or metalloid species from an aqueous acidic media comprising exposing the media to supercritical carbon dioxide, a salt and at least one nonhalogenated chelating agent selected from the group consisting of trialkyl phosphates, triaryl phosphates, alkyl-aryl phosphates, trialkylphosphine oxides, triarylphosphine oxides, alkyl-arylphosphine oxides, and mixtures thereof, at least one of the chelating agents forming chelates with the species, the chelates being soluble in the supercritical carbon dioxide.

15. The method according to claim 14 comprising exposing the media to at least one phosphate chelating agents represented by the formula

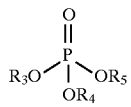

wherein $R_3$–$R_5$ are selected from the group consisting of lower alkyl groups and aryl groups, and wherein the phosphine oxide chelating agents are represented by the formula

wherein $R_6$–$R_8$ are selected from the group consisting of lower alkyl groups and aryl groups.

16. The method according to claim 15 wherein $R_3=R_4=R_5$, and wherein $R_6=R_7=R_8$.
17. The method according to claim 15 wherein $R_3$–$R_5$ are independently selected from the group consisting of butyl and octyl, and wherein $R_6$–$R_8$ are independently selected from the group consisting of butyl, octyl and phenyl.
18. The method according to claim 14 wherein the acidic media is an acidic solution.
19. The method according to claim 14 wherein the acidic media is nitric acid, and the salt is a nitrate salt.
20. The method according to claim 14 comprising exposing the media to at least one chelating agent selected from the group consisting of tributyl phosphate, tributylphosphine oxide, tri-n-octylphosphine oxide, triphenylphosphine oxide, and mixtures thereof.
21. The method according to claim 14 and further comprising adding a modifying solvent to the carbon dioxide, wherein the modifying solvent is selected from the group consisting of water, lower alkyl alcohols, and mixtures thereof.
22. The method according to claim 14 and further comprising exposing the acidic media to a β-diketone chelating agent.
23. A method for extracting metal or metalloid species from an acidic solution that contains a salt, comprising exposing the acidic solution to supercritical carbon dioxide containing at least one chelating agent selected from the group consisting of phosphate chelating agents and phosphine oxide chelating agents, wherein the phosphate chelating agents are represented by the formula

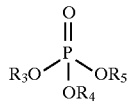

wherein $R_3$–$R_5$ are selected from the group consisting of lower alkyl groups and aryl groups, and wherein the phosphine oxide chelating agents are represented by the formula

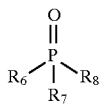

wherein $R_6$–$R_8$ are selected from the group consisting of lower alkyl groups and aryl groups.

24. The method according to claim 23 wherein the chelating agent is selected from the group consisting of tributyl phosphate, triphenyl phosphate, tributylphosphine oxide, tri-n-octylphosphine oxide, triphenylphosphine oxide, and mixtures thereof.

25. The method according to claim 23 and further comprising adding a modifying solvent to the carbon dioxide, wherein the modifying solvent is selected from the group consisting of water, lower alkyl alcohols, and mixtures thereof.

26. The method according to claim 23 and further comprising exposing the acidic media to a β-diketone chelating agent.

27. A method for extracting metal or metalloid species from a nitric acid solution that contains a nitrate salt, comprising exposing the acidic solution to supercritical carbon dioxide and at least one chelating agent selected from the group consisting of tributy phosphate, triphenyl phosphate, tributylphosphine oxide, tri-n-octylphosphine oxide, triphenylphosphine oxide, and mixtures thereof.

28. A method for treating acidic waste material containing metalloid and/or metal species, comprising the steps of:

providing a container containing an acidic aqueous waste material;

exposing the acidic aqueous waste material in the container to supercritical carbon dioxide, a salt and at least one phosphorous-containing chelating agent wherein phosphorous does not have a halogen atom bonded thereto, the chelating agent being selected from the group consisting of trialkyl phosphates, triaryl phosphates, alkl-aryl phosphates, trialkylphosphine oxides, triarylphosphine oxides, alkyl-arylphosphine oxides, and mixtures thereof, at least one of the chelating agents forming chelates with the species, the chelates being soluble in the carbon dioxide; and removing the carbon dioxide and solubilized waste species from the container.

29. The method according to claim 28 comprising exposing the media to at least one chelating agent selected from the group consisting of tributyl phosphate, triphenyl phosphate, tributylphosphine oxide, tri-n-octylphosphine oxide, triphenylphosphine oxide, and mixtures thereof.

30. The method according to claim 28 and further comprising exposing the acidic media to a β-diketone chelating agent.

31. A method for extracting metal or metalloid species from an acidic aqueous media containing a salt, the method comprising exposing the acidic aqueous media containing a salt to supercritical carbon dioxide and a first chelating agent selected from the group consisting of trialkyl phosphates, triaryl phosphates, alkyl-aryl phosphates, trialkylphosphine oxides, triarylphosphine oxides, alkyl-arylphosphine oxides, and mixtures thereof, and a second β-diketone chelating agent, at least one of the chelating agents forming chelates with the species, the chelates being soluble in the supercritical carbon dioxide.

* * * * *

UNITED STATES PATENT AND TRADEMARK OFFICE
CERTIFICATE OF CORRECTION

PATENT NO. : 5,770,085

DATED : June 23, 1998

INVENTOR(S) : Wai, et al.

It is certified that error appears in the above-identified patent and that said Letters Patent is hereby corrected as shown below:

Column 32, line 67, delete "alklaryl phosphates" and replace with --alkyl-aryl phosphates--.

Signed and Sealed this

Sixteenth Day of February, 1999

Attest:

Attesting Officer

Acting Commissioner of Patents and Trademarks